United States Patent
Xu et al.

(10) Patent No.: US 9,771,524 B2
(45) Date of Patent: Sep. 26, 2017

(54) METHOD AND APPARATUS FOR IMPROVING A HYDROCARBON FEED

(71) Applicant: ExxonMobil Chemical Patents Inc., Baytown, TX (US)

(72) Inventors: Teng Xu, Houston, TX (US); Kapil Kandel, Humble, TX (US); David T. Ferrughelli, Flemington, NJ (US); Michael J. Clemmons, Mont Belvieu, TX (US); James H. Beech, Jr., Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 270 days.

(21) Appl. No.: 14/679,089

(22) Filed: Apr. 6, 2015

(65) Prior Publication Data

US 2015/0361354 A1     Dec. 17, 2015

Related U.S. Application Data

(60) Provisional application No. 62/011,959, filed on Jun. 13, 2014.

(30) Foreign Application Priority Data

Jul. 31, 2014   (EP) .................................... 14179226

(51) Int. Cl.
  *C10G 31/10*   (2006.01)
  *C10G 55/04*   (2006.01)
  (Continued)

(52) U.S. Cl.
  CPC .......... *C10G 31/10* (2013.01); *B01D 21/262* (2013.01); *B01J 19/24* (2013.01); *C10G 55/04* (2013.01);
  (Continued)

(58) Field of Classification Search
  CPC ........ C10G 31/10; C10G 55/04; C10G 67/02; C10G 69/06; B01D 21/262; B01J 19/24; B01J 2219/24
  See application file for complete search history.

(56) References Cited

U.S. PATENT DOCUMENTS 2,382,260 A   8/1945 Schaad
3,278,415 A   10/1966 Doberenz et al.
(Continued)

FOREIGN PATENT DOCUMENTS

DE   550 157   4/1932
EP   0 274 604   7/1988
(Continued)

OTHER PUBLICATIONS

U.S. Appl. No. 62/005,679, filed May 30, 2014.
U.S. Appl. No. 61/986,316, filed Apr. 30, 2014.

*Primary Examiner* — Randy Boyer
*Assistant Examiner* — Juan Valencia

(57) ABSTRACT

Methods for upgrading a hydrocarbon feed are disclosed. The methods include a hydrocarbon feed having an insolubility number, $I_{feed}$, with at least a first fluid to form a fluid-feed mixture; and inducing a centrifugal force to the fluid-feed mixture sufficient to form at least a higher density portion and a lower density portion, said lower density portion having an insolubility number, $I_{LD}$, wherein $I_{LD}/I_{feed} \leq 0.95$. Methods and apparatus for hydroprocessing the treated feed and blending with a fuel oil blend-stock are also described.

14 Claims, 3 Drawing Sheets

(51) Int. Cl.
  *C10G 67/02* (2006.01)
  *C10G 69/06* (2006.01)
  *B01D 21/26* (2006.01)
  *B01J 19/24* (2006.01)

(52) U.S. Cl.
  CPC .............. *C10G 67/02* (2013.01); *C10G 69/06* (2013.01); *B01J 2219/24* (2013.01)

(56) References Cited

U.S. PATENT DOCUMENTS

| | | | |
|---|---|---|---|
| 4,572,781 A * | 2/1986 | Krasuk | C10G 21/003 208/309 |
| 4,732,664 A | 3/1988 | Martini et al. | |
| 4,741,840 A | 5/1988 | Atherton et al. | |
| 5,158,668 A | 10/1992 | Chahar et al. | |
| 5,871,634 A | 2/1999 | Wiehe et al. | |
| 6,579,443 B1 | 6/2003 | Iaccino et al. | |
| 2006/0070912 A1 | 4/2006 | Khan | |
| 2008/0099371 A1* | 5/2008 | McCoy | C10G 55/04 208/86 |
| 2008/0156700 A1 | 7/2008 | Abulnaga et al. | |
| 2009/0272671 A1 | 11/2009 | Keusenkothen | |
| 2011/0083997 A1 | 4/2011 | Silva et al. | |
| 2014/0238898 A1* | 8/2014 | Gillis | C10G 67/049 208/86 |

FOREIGN PATENT DOCUMENTS

| | | |
|---|---|---|
| EP | 0626440 | 11/1994 |
| EP | 2 336 268 | 6/2011 |
| EP | 2692834 | 2/2014 |
| WO | 2005/002701 | 1/2005 |
| WO | 2007/106775 | 9/2007 |
| WO | 2013/033580 | 3/2013 |
| WO | 2013/033590 | 3/2013 |

* cited by examiner

_US 9,771,524 B2_

METHOD AND APPARATUS FOR IMPROVING A HYDROCARBON FEED

CROSS-REFERENCE TO RELATED APPLICATIONS

This application claims priority to and the benefit of U.S. Provisional Application No. 62/011,959, filed Jun. 13, 2014, and European Application No. 14179226.7, filed Jul. 31, 2014, all of which are incorporated by reference in their entireties. The present application expressly incorporates by reference herein the entire disclosures of U.S. Provisional Application No. 62/011,965 filed Jun. 13, 2014, entitled "Hydrocarbon Upgrading".

FIELD OF INVENTION

The invention generally relates to improving hydrocarbon feedstock compatibility. More particularly, the invention relates to processes which include subjecting a hydrocarbon feedstock to a centrifugal force to segregate problematic components of the feed into a separable, higher-density fraction, to the hydrocarbon products of such processes, and to equipment useful for such processes.

BACKGROUND OF INVENTION

Steam cracking, also referred to as pyrolysis, has long been used to crack hydrocarbon feedstocks into a wide range of relatively high value molecules, including ethylene, propene, butenes, steam cracked gas oil ("SCGO"), etc. Besides these useful products, hydrocarbon pyrolysis can also produce a significant amount of relatively low-value heavy products, such as pyrolysis tar. When the pyrolysis is produced by steam cracking, the pyrolysis tar is identified as steam-cracker tar ("SCT"). Economic viability of refining processes relies in part on the ability to incorporate as much of the product and residual fractions, such as SCT, into the value chain. One use of residual and/or relatively low value products is to blend these fractions with other hydrocarbons, e.g., with other feedstreams or products.

SCT, however, generally contains relatively high molecular weight molecules, conventionally called Tar Heavies ("TH"). The presence of TH renders the SCT incompatible for blending, e.g., with fuel oil blend-stocks or different SCTs. Compatibility is generally determined by visual inspection for solids formation, e.g., as described in U.S. Pat. No. 5,871,634. Generally, SCTs are not compatible with other heavy hydrocarbons such as fuel oil, or are only compatible in small amounts. Likewise, SCTs produced under specific conditions are generally incompatible with SCT produced under different conditions.

Compatibility can be improved by treating the SCT with a gas containing molecular hydrogen in the presence of a hydroprocessing catalyst, typically containing one or more of Co, Ni, or Mo. Catalytic hydroprocessing of undiluted SCT, however, leads to significant catalyst deactivation and the formation of undesirable deposits (e.g., coke deposits) on the reactor internals. As the amount of these deposits increases, the yield of the desired upgraded pyrolysis tar (upgraded SCT) decreases and the yield of undesirable byproducts increases. The hydroprocessing reactor pressure drop also increases, often to a point where the reactor is inoperable.

It is conventional to lessen deposit formation by hydroprocessing the SCT in the presence of a fluid, e.g., a solvent having significant aromatics content. The product of the hydroprocessing comprises an upgraded SCT product that generally has a decreased viscosity, decreased atmospheric boiling point range, and increased hydrogen content over that of the feed's SCT, resulting in improved compatibility with fuel oil blend-stocks. Additionally, hydroprocessing the SCT in the presence of fluid produces fewer undesirable byproducts and the rate of increase in reactor pressure drop is lessened. Conventional processes for SCT hydroprocessing are disclosed in U.S. Pat. Nos. 2,382,260 and 5,158,668; and in International Patent Application Publication No. WO 2013/033590, which involves recycling a portion of the hydroprocessed tar for use as the fluid.

Hydroprocessing, however, is a relatively costly method for upgrading SCT to make it more suitable for blending. Moreover, the benefits of hydroprocessing can sometimes be less than desired. For example, an SCT may require filtration or long settling periods before, during, or after hydroprocessing, in order to remove solid particles. Filtration may be needed even when the SCT is hydroprocessed in combination with a fluid. Solids removal by particle settlement can be extremely slow and/or energy intensive, leading to the presence of problematic molecules even after settling. Each of these methods adds costs and can still lead to an SCT that is incompatible with fuel oil, and to other hydroprocessing problems as described above.

Thus, a process that selectively removes problematic components from hydrocarbon feedstock such as SCT to improve the compatibility of hydrocarbons with fuel oil and/or renders the SCT more amenable to hydroprocessing would be beneficial.

SUMMARY OF INVENTION

Certain aspects of the invention are based on the discovery that preferentially removing, particularly by centrifuging, certain higher density components in the hydrocarbon feed may result in a feed having improved compatibility with typical blend stocks such as fuel oils. Centrifuging segregates highly viscous, higher density materials (e.g., tar heavies, asphaltenes etc.) that tend to cause blending incompatibilities, allowing for acceptable yields by leaving useful components in the lower density portion. Aspects of the invention are also based in part on the discovery that separation from the feed of a higher density portion, e.g., by centrifuge, can increase the compatibility of hydrocarbon feed to a greater extend while removing a relatively smaller amount of the feed, leading to a greater yield of compatible blendstock.

Thus, certain aspects of the invention provide a method for upgrading a hydrocarbon feed, comprising: (a) combining a hydrocarbon feed having an insolubility number, $I_{feed}$, with at least a first fluid to form a fluid-feed mixture; and (b) exposing the fluid-feed mixture to a centrifugal force sufficient to form at least a higher density portion and a lower density portion, said lower density portion having an insolubility number, $I_{LD}$, wherein $I_{LD}/I_{feed} \leq 0.95$. These aspects can further include blending heavy hydrocarbon and at least a part of the lower density portion to produce a blend that is substantially free of precipitated asphaltenes.

The invention also relates to a method of hydroprocessing a hydrocarbon feed comprising: (a) combining a hydrocarbon feed having an insolubility number, $I_{feed}$, with at least a first fluid to form a fluid-feed mixture; (b) applying a centrifugal force to the fluid-feed mixture sufficient to form at least a higher density portion and a lower density portion; and (c) feeding said lower density portion to a hydroprocessing reactor operating at hydroprocessing conditions to produce a hydroprocessed effluent.

In other aspects, the invention relates to the hydrocarbon products of any of the foregoing processes, and to mixtures comprising any of such hydrocarbon products and a second hydrocarbon, particularly mixtures which are substantially free of precipitated asphaltenes.

In other aspects, the invention relates to equipment and combinations thereof for use in any of the foregoing processes. Accordingly, in certain aspects the invention relates to an apparatus for upgrading a hydrocarbon feed, comprising: (a) a hydrocarbon feed source in fluid communication with a fluid source to provide a fluid-feed mixture; (b) a first separation unit configured to receive the fluid-feed mixture, said separation unit comprising a centrifuge capable of separating from the hydrocarbon feed a higher density portion and a lower density portion; and (c) removing at least the lower density portion. Particular aspects may optionally further include a hydroprocessing reactor in fluid communication with first separation unit, said hydroprocessing reactor capable of providing a hydroprocessed effluent from the lower density portion and further optionally a second separation unit for separating from the hydroprocessed effluent a fluid-enriched stream and a product stream. Certain aspects may also include (i) blending means, e.g., for blending at least a portion of the lower density portion with a fuel oil blend-stock, and/or a (ii) one or more conduits, the conduits being configured to convey the hydrocarbon products of any of the foregoing processes to other locations in the process, e.g., to recycle the fluid-enriched stream to the blending means.

The invention also relates to a steam cracker tar upgrading method, the method comprising: a) combining a hydrocarbon feed having an insolubility number, $I_{feed}$, with at least a first fluid to form a fluid-feed mixture; and b) separating from the fluid-feed mixture at least a higher density portion and a lower density portion, said lower density portion having an insolubility number, $I_{LD}$, wherein $I_{LD}/I_{feed} \leq 0.95$. The method can further include combining heavy hydrocarbon and at least part of the lower density portion to produce a mixture that is substantially free of precipitated asphaltenes.

These and other features, aspects, and advantages of the present invention will become better understood from the following description, appended claims, and accompanying drawings.

DETAILED DESCRIPTION

Definitions

Figure 1:
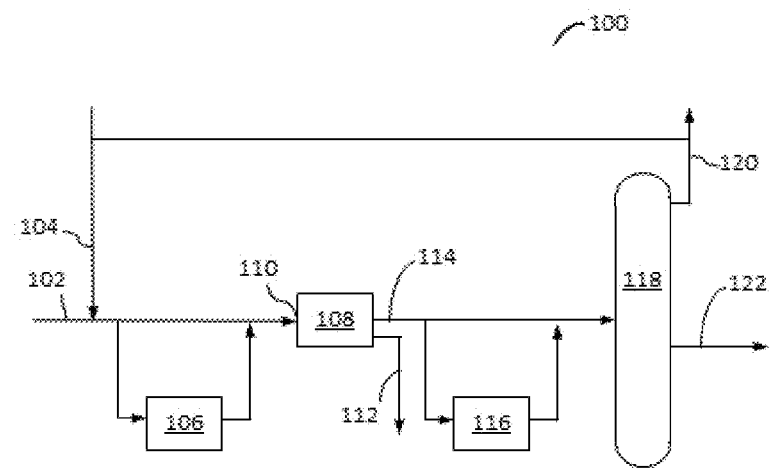
FIG. 1 illustrates a process 100 according to an aspect of the invention.

"Hydrocarbon feed" refers to a flowable composition, e.g., liquid phase, high viscosity, and/or slurry compositions, which (i) includes carbon bound to hydrogen and (ii) has a mass density greater than that of gasoline. Such compositions can include one or more of crude oil, crude oil fraction, and compositions derived therefrom which (i) have a kinematic viscosity $\leq 1.5 \times 10^3$ cSt at 50° C., (ii) contain carbon bound to hydrogen, and (iii) have a mass density $\geq 740$ kg/m$^3$. Hydrocarbon feeds typically have a final boiling point at atmospheric pressure ("atmospheric boiling point") $\geq 430°$ F. (220° C.). Certain hydrocarbon feeds include components having an atmospheric boiling point $\geq 290°$ C., e.g., hydrocarbon feeds comprising $\geq 20\%$ (by weight) of components having an atmospheric boiling point $\geq 290°$ C., e.g., $\geq 50\%$, such as $\geq 75\%$, or $\geq 90\%$. Certain hydrocarbon feeds appear to have the color black or dark brown when illuminated by sunlight, including those having a luminance $\leq 7$ cd/m$^2$, luminance being measured in accordance with CIECAM02, established by the Commission Internationale de l'éclairage. Non-limiting examples of such feeds include pyrolysis tar, SCT, vacuum resid, atmospheric resid, vacuum gas oil ("VGO"), atmospheric gas oil ("AGO"), heavy atmospheric gas oil ("HAGO"), steam cracked gas oil ("SCGO"), deasphalted oil ("DAO"), cat cycle oil ("CCO", including light cat cycle oil, "LCCO", and heavy cat cycle oil, "HCCO"), natural and synthetic feeds derived from tar sands, shale oil, coal etc.

"SCT" means (a) a mixture of hydrocarbons having one or more aromatic components and optionally (b) non-aromatic and/or non-hydrocarbon molecules, the mixture being derived from hydrocarbon pyrolysis and having a 90% Total Boiling Point $\geq$ about 550° F. (290° C.) (e.g., $\geq 90.0$ wt. % of the SCT molecules have an atmospheric boiling point $\geq 550°$ F. (290° C.)). SCT can comprise $>50.0$ wt. % (e.g., $>75.0$ wt. %, such as $>90.0$ wt. %), based on the weight of the SCT, of hydrocarbon molecules (including mixtures and aggregates thereof) having (i) one or more aromatic components and (ii) a number of carbon atoms $\geq 15$. SCT generally has a metals content, $\leq 1.0 \times 10^3$ ppmw, based on the weight of the SCT (e.g., an amount of metals that is far less than that found in crude oil (or crude oil components) of the same average viscosity).

"Tar Heavies" (TH) means a product of hydrocarbon pyrolysis, the TH having an atmospheric boiling point $>565°$ C. and comprising $>5.0$ wt. % of molecules having a plurality of aromatic cores based on the weight of the product. The TH are typically solid at 25.0° C. and generally include the fraction of SCT that is not soluble in a 5:1 (vol.:vol.) ratio of n-pentane:SCT at 25.0° C. TH generally includes asphaltenes and other high molecular weight molecules.

"Solubility blending number (S)" and "insolubility number (I)" are described in U.S. Pat. No. 5,871,634, incorporated herein by reference in its entirety, and determined using n-heptane as the so-called "nonpolar, nonsolvent" and chlorobenzene as the solvent. S and I are determined at a weight ratio of oil to test liquid mixture in the range of from 1.0 to 5.0. Various such values are referred to herein. For example, "$I_{feed}$" refers to the insolubility number of the hydrocarbon feed; "$I_{LD}$" refers to the insolubility number of the lower density portion separated from the hydrocarbon feed; "$I_{HD}$" refers to the insolubility number of the higher density portion separated from the hydrocarbon feed; "$I_{treated}$" refers to the insolubility number of the treated portion obtained from the lower density portion; "$I_{product}$" refers to the insolubility number of the hydroprocessed product; "$S_{FO}$" refers to the solubility blending number of the fuel oil blend-stock; and "$S_{fluid}$" refers to the solubility blending number of the fluid or the fluid-enriched stream, as appropriate.

The terms "higher density portion" and "lower density portion" are relative terms meaning that a higher density portion has a mass density ($\rho_2$) that is higher than the density of the lower density portion ($\rho_1$), e.g., $\rho_2 \geq 1.01*\rho_1$, such as $\rho_2 \geq 1.05*\rho_1$, or $\rho_2 \geq 1.10*\rho_1$. In some aspects, the higher density portion comprises primarily solid components and the lower density portion comprises primarily liquid phase components. The higher density component may also include liquid phase components that have segregated from the lower density portion.

The term "portion" generally refers to one or more components derived from the fluid-feed mixture.

Except for its use with respect to parts-per-million, the term "part" is used with respect to a designated process stream, generally indicating that less than the entire designated stream may be selected.

Description

The invention is based in part on the discovery that combining a hydrocarbon feed with a fluid and separating from the fluid-feed mixture certain higher density components may result in a feed having improved compatibility with typical fuel oil blend-stocks and/or improve catalytic hydroprocessing of the fluid feed mixtures.

The Hydrocarbon Feed

The hydrocarbon feed may comprise one or more hydrocarbon feeds described above, particularly SCT, resid or combinations thereof. Generally, the hydrocarbon feed has an insolubility number, $I_{feed} \geq$ about 20.0, e.g., ≥about 30.0, ≥about 40.0, ≥about 50.0, ≥about 60.0, ≥about 70.0, ≥about 80.0, ≥about 90.0, ≥about 100.0, ≥about 110.0, ≥about 120.0, ≥about 130.0, ≥about 140.0, or ≥about 150.0. Additionally or alternatively, the insolubility number of the feed may be ≤about 150.0, e.g., ≤about 140.0, ≤about 130.0, ≤about 120.0 ≤about 110.0, ≤about 100.0, ≤about 90.0, ≤about 80.0, ≤about 70.0, ≤about 60.0, ≤about 50.0, ≤about 40.0, or ≤about 30.0. Ranges expressly disclosed include combinations of any of the above-enumerated values; e.g., about 20.0 to about 150.0, about 30.0 to about 150.0, about 40.0 to about 150.0, about 50.0 to about 150.0, about 60.0 to about 150.0, about 70.0 to about 150.0, about 80.0 to about 150.0, about 90.0 to about 150.0, about 100.0 to about 150.0, about 110.0 to about 150.0, about 120.0 to about 150.0, about 130.0 to about 150.0, about 140.0 to about 150.0, etc. Particular hydrocarbon feeds, e.g., certain SCTs, have an insolubility number, $I_{feed}$, of about 90.0 to about 150.0, about 100.0 to about 150.0, about 110.0 to about 150.0, about 120.0 to about 150.0, or about 130.0 to about 150.0. For other hydrocarbon feeds, e.g., resid, the $I_{feed}$ may be about 20 to about 90.0, about 30.0 to 80.0, or about 40.0 to about 70.0. In certain aspects, the hydrocarbon feed has a mass density ≥0.93 g/ml, e.g., ≤0.94 g/ml, such as ≤0.95 g/ml, or ≤0.96 g/ml, e.g., in the range of 0.93 to 0.97 g/ml.

In certain aspects, it is desirable to utilize as a feed an SCT having little or no olefin content, particularly in aspects where one or more components of the fluid-feed mixture, e.g., the lower density portion or a part thereof, is subjected to hydroprocessing after separation. It is observed that the rate of reactor pressure-drop increase across the hydroprocessing reactor is lessened when utilizing an SCT having a lesser olefin content, e.g., a lesser content of vinyl aromatics. For example, in certain aspects the amount of olefin the SCT is ≤10.0 wt. %, e.g., ≤5.0 wt. %, such as ≤2.0 wt. %, based on the weight of the SCT. More particularly, the amount of (i) vinyl aromatics in the SCT and/or (ii) aggregates in the SCT which incorporate vinyl aromatics is generally ≤5.0 wt. %, e.g., ≤3 wt. %, such as ≤2.0 wt. %, based on the weight of the SCT.

The invention is compatible with hydrocarbon feeds having a relatively high sulfur content, e.g., ≥0.1 wt. %, based on the weight of the SCT, such as ≥1.0, or ≥2.0 wt. %, or in the range of 0.5 wt. % to 7.0 wt. %. High sulfur content is not required, and relatively low sulfur-content SCT can be used, e.g., SCT having a sulfur content <0.1 wt. %, based on the weight of the SCT, e.g., ≤0.05 wt. %, such as ≤0.01 wt. %. Hydrocarbon feeds having (i) a lesser olefin content and/or (ii) a higher sulfur content, and methods for producing such feeds, are disclosed in U.S. Patent Application No. 62/005,679, which is incorporated by reference herein in its entirety.

The Fluid-feed Mixture

The hydrocarbon feed is combined by any suitable method with a fluid to form a fluid-feed mixture. The fluid-feed mixture generally comprises ≥about 5.0 wt. % of the hydrocarbon feed, e.g., ≥about 10.0 wt. %, ≥about 20.0 wt. %, ≥about 30.0 wt. %, ≥about 40.0 wt. %, ≥about 50.0 wt. %, ≥about 60.0 wt. %, ≥about 70.0 wt. %, ≥about 80.0 wt. %, or ≥about 90.0 wt. % hydrocarbon feed, based on the total weight of the fluid-feed mixture. Additionally or alternatively, the fluid-feed mixture may include ≤about 10.0 wt. % hydrocarbon feed, e.g., ≤about 20.0 wt. %, ≤about 30.0 wt. %, ≤about 40.0 wt. %, ≤about 50.0 wt. %, ≤about 60.0 wt. %, ≤about 70.0 wt. %, ≤about 80.0 wt. %, ≤about 90.0 wt. %, or ≤about 95.0 wt. % hydrocarbon feed, based on the total weight of the fluid feed mixture. Ranges expressly disclosed include combinations of any of the above-enumerated values, e.g., about 5.0 to about 95.0 wt. %, about 5.0 to about 90.0 wt. %, about 5.0 to about 80 wt. %, about 5.0 to about 70.0 wt. %, about 5.0 to about 60.0 wt. %, about 5.0 to about 50.0 wt. %, about 5.0 to about 40.0 wt. %, about 5.0 to about 30.0 wt. %, about 5.0 to about 20.0 wt. %, about 5.0 to about 10.0 wt. % hydrocarbon feed, etc.

In addition to the hydrocarbon feed, the fluid-feed mixture generally comprises ≥about 5.0 wt. % fluid, e.g., ≥about 10.0 wt. %, ≥about 20.0 wt. %, ≥about 30.0 wt. %, ≥about 40.0 wt. %, ≥about 50.0 wt. %, ≥about 60.0 wt. %, ≥about 70.0 wt. %, ≥about 80.0 wt. %, or ≥about 90.0 wt. %, based on the total weight of the fluid-feed mixture. Additionally or alternatively, the fluid-feed mixture may include ≤about 10 wt. % fluid, e.g., ≤about 20 wt. %, ≤about 30 wt. %, ≤about 40 wt. %, ≤about 50 wt. %, ≤about 60 wt. %, ≤about 70 wt. %, ≤about 80 wt. %, ≤about 90 wt. %, or ≤about 95.0 wt. % fluid, based on the total weight of the fluid feed mixture. Ranges expressly disclosed include combinations of any of the above-enumerated values, e.g., about 5.0 to about 95.0 wt. %, about 5.0 to about 90.0 wt. %, about 5.0 to about 80 wt. %, about 5.0 to about 70.0 wt. %, about 5.0 to about 60.0 wt. %, about 5.0 to about 50.0 wt. %, about 5.0 to about 40.0 wt. %, about 5.0 to about 30.0 wt. %, about 5.0 to about 20.0 wt. %, about 5.0 to about 10.0 wt. % fluid, etc.

Generally, the fluid includes a utility fluid and/or a separation fluid. It can be beneficial for the fluid to comprise utility fluid, such as in aspects which include hydroprocessing one or more fluid-feed mixture components after exposing the fluid-feed mixture to a centrifugal force. In particular aspects, the fluid comprises ≥about 65.0 wt. % utility fluid, e.g., ≥about 75.0 wt. %, ≥about 80.0 wt. %, ≥about 85.0 wt. %, ≥about 90.0 wt. %, or ≥about 95.0 wt. % utility fluid, based on the total weight of the fluid in the fluid-feed mixture. Additionally or alternatively, the fluid may comprise ≤about 100.0 wt. % utility fluid, e.g., ≤about 95.0 wt. %, ≤about 90.0 wt. %, ≤about 85.0 wt. %, ≤about 80.0 wt. %, ≤about 75.0 wt. %, or ≤about 70.0 wt. % utility fluid, based on the total weight of the fluid in the fluid-feed mixture. Ranges expressly disclosed include combinations of any of the above-enumerated values, e.g., about 65.0 to about 100.0 wt. %, about 75.0 to about 100.0 wt. %, about 80.0 to about 100.0 wt. %, about 85.0 to about 100.0 wt. %, about 90.0 to about 100.0 wt. %, about 95.0 to about 100.0 wt. % utility fluid, etc.

The fluid may optionally include a separation fluid, typically in an amount of ≤about 35.0 wt. %, e.g., ≤about 30.0 wt. %, ≤about 25.0 wt. %, ≤about 20.0 wt. %, ≤about 15.0 wt. %, ≤about 10.0 wt. %, ≤about 5.0 wt. %, ≤about 2.5 wt. %, or ≤about 1.5 wt. %, based on the total weight of fluid in the fluid-feed mixture. Additionally or alternatively, the separation fluid may be present in an amount ≥to about 0 wt. %, e.g., ≥about 1.5 wt. %, ≥about 2.5 wt. %, ≥about 5.0 wt. %, ≥about 10.0 wt. %, ≥about 15.0 wt. %, ≥about 20.0 wt. %, ≥about 25.0 wt. %, or ≥about 30.0 wt. %, based on the total weight of the fluid in the fluid-feed mixture. Ranges expressly disclosed include combinations of any of the above-enumerated values, e.g., 0 to about 35.0 wt. %, 0 to about 30.0 wt. %, 0 to about 25.0 wt. %, 0 to about 20.0 wt. %, 0 to about 15.0 wt. %, 0 to about 10.0 wt. %, 0 to about 5.0 wt. %, 0 to about 2.5 wt. %, 0 to about 1.5 wt. % separation fluid, etc., based on the total weight of fluid in the fluid-feed mixture.

Particularly in aspects where fluid-feed mixture components are not subjected to subsequent hydroprocessing, the fluid may comprise primarily a separation fluid. Thus, in some aspects, the fluid may comprise ≥about 50.0 wt. % separation fluid, e.g., ≥about 60.0 wt. %, ≥about 70.0 wt. %, ≥about 80.0 wt. %, ≥about 90.0 wt. %, ≥about 95.0 wt. %, ≥about 97.5 wt. %, ≥about 99.0 wt. %, or about 100.0 wt. % separation fluid, based on the total weight of the fluid-feed mixture. Additionally or alternatively, the fluid-feed mixture may include ≤about 99.0 wt. % separation fluid, e.g., ≤about 97.5 wt. %, ≤about 95.0 wt. %, ≤about 90.0 wt. %, ≤about 80.0 wt. %, ≤about 70.0 wt. %, or ≤about 60.0 wt. % separation fluid, based on the total weight of the fluid-feed mixture. Ranges expressly disclosed include combinations of any of the above-enumerated values, e.g., about 50.0 to about 100.0 wt. %, about 60.0 to about 100.0 wt. %, about 70.0 to about 100.0 wt. %, about 80.0 to about 100.0 wt. %, about 90.0 to about 100.0 wt. %, about 95.0 to about 100.0 wt. %, about 97.5 to about 100.0 wt. %, about 99.0 to about 100.0 wt. % separation fluid, etc.

Generally, but not necessarily, the kinetic viscosity of the fluid-feed mixture is less than that of the hydrocarbon feed. In particular aspects, the kinetic viscosity of the fluid-feed mixture may be ≥about 0.5 cPoise, e.g., ≥about 1.0 cPoise, ≥about 2.5 cPoise, ≥about 5.0 cPoise, ≥about 7.5 cPoise. Additionally or alternatively, the kinetic viscosity of the fluid-feed mixture may be ≤about 10.0 cPoise, e.g., ≤about 7.5 cPoise, ≤about 5.0 cPoise, ≤about 2.5 cPoise, ≤about 1.0 cPoise, ≤about 0.75 cPoise. Ranges expressly disclosed include combinations of any of the above-enumerated values, e.g., about 0.5 to about 10.0 cPoise, about 1.0 to about 10.0 cPoise, about 2.5 to about 10.0 cPoise, about 5.0 to about 10.0 cPoise, about 7.5 to about 10.0 cPoise, etc.

The Utility Fluid

The utility fluid may be any fluid comprising ≥40.0 wt. %, ≥45.0 wt. %, ≥50.0 wt. %, ≥55.0 wt. %, or ≥60.0 wt. %, based on the weight of the utility fluid, of at least one aromatic or non-aromatic ring-containing compound. Particular utility fluids comprise ≥40.0 wt. %, ≥45.0 wt. %, ≥50.0 wt. %, ≥55.0 wt. %, or ≥60.0 wt. % of at least one multi-ring compound, based on the weight of the utility fluid. The compounds comprise a majority of carbon and hydrogen atoms, but can also contain a variety of substituents and/or heteroatoms.

In certain aspects, the utility fluid comprises aromatics, e.g., ≥70.0 wt. % aromatics, based on the weight of the utility fluid, such as ≥80.0 wt. %, or ≥90.0 wt. %. Typically, the utility fluid comprises ≤10.0 wt. % of paraffin, based on the weight of the utility fluid. For example, the utility fluid can comprise ≥95.0 wt. % of aromatics, ≤5.0 wt. % of paraffin. Optionally, the utility fluid has a final boiling point ≤750° C. (1400° F.), e.g., ≤570° C. (1050° F.), such as ≤430° C. (806° F.). Such utility fluids can comprise ≥25.0 wt. % of 1-ring and 2-ring aromatics (i.e., those aromatics having one or two rings and at least one aromatic core), based on the weight of the utility fluid. Utility fluids having a relatively low final boiling point can be used, e.g., a utility fluid having a final boiling point ≤400° C. (750° F.). The utility fluid can have an 10% (weight basis) total boiling point ≥120° C., e.g., ≥140° C., such as ≥150° C. and/or a 90% total boiling point ≤430° C., e.g., ≤400° C. Suitable utility fluids include those having a true boiling point distribution generally in the range of from 175° C. (350° F.) to about 400° C. (750° F.). A true boiling point distribution can be determined, e.g., by conventional methods such as the method of A.S.T.M. D7500, which can be extended by extrapolation when the true boiling point distribution has a final boiling point that is outside the range encompassed by the A.S.T.M. method. In certain aspects, the utility fluid has a mass density ≤0.91 g/ml, e.g., ≤0.90 g/ml, such as ≤0.89 g/ml, or ≤0.88 g/ml, e.g., in the range of 0.87 to 0.90 g/ml.

The utility fluid typically comprises aromatics, e.g., ≥95.0 wt. % aromatics, such as ≥99.0 wt. %. For example, the utility fluid comprises ≥95.0 wt. % based on the weight of the utility fluid of one or more of benzene, ethylbenzene, trimethylbenzene, xylenes, toluene, naphthalenes, alkylnaphthalenes (e.g., methylnaphthalenes), tetralins, or alkyltetralins (e.g., methyltetralins), e.g., ≥99.0 wt. %, such as ≥99.9 wt. %. It is generally desirable for the utility fluid to be substantially free of molecules having alkenyl functionality, particularly in aspects utilizing a hydroprocessing catalyst having a tendency for coke formation in the presence of such molecules. In certain aspects, the supplemental utility fluid comprises ≤10.0 wt. % of ring compounds having $C_1$-$C_6$ sidechains with alkenyl functionality, based on the weight of the utility fluid.

Certain solvents and solvent mixtures can be used as utility fluid, including steam cracked naphtha ("SCN"), SCGO, and/or other solvent comprising aromatics, such as those solvents comprising ≥90.0 wt. %, e.g., ≥95.0 wt. %, such as ≥99.0 wt. % of aromatics, based on the weight of the solvent. Representative aromatic solvents that are suitable for use as utility fluid include A200 solvent, available from ExxonMobil Chemical Company (Houston Tex.), CAS number 64742-94-5. In one or more aspects, the utility fluid (i) has a critical temperature in the range of 285° C. to 400° C., and (ii) comprises aromatics, including alkyl-functionalized derivatives thereof. For example, the specified utility fluid can comprise ≥90.0 wt. % of a single-ring aromatic, including those having one or more hydrocarbon substituents, such as from 1 to 3 or 1 to 2 hydrocarbon substituents. Such substituents can be any hydrocarbon group that is consistent with the overall solvent distillation characteristics. Examples of such hydrocarbon groups include, but are not limited to, those selected from the group consisting of $C_1$-$C_6$ alkyl, wherein the hydrocarbon groups can be branched or linear and the hydrocarbon groups can be same or different. Optionally, the specified utility fluid comprises ≥90.0 wt. % based on the weight of the utility fluid of one or more of benzene, ethylbenzene, trimethylbenzene, xylenes, toluene, naphthalenes, alkylnaphthalenes (e.g., methylnaphtalenes), tetralins, or alkyltetralins (e.g., methyltetralins).

Although not critical, typically the utility fluid can be one that is substantially free of molecules having terminal unsaturates, for example, vinyl aromatics, particularly in aspects utilizing a hydroprocessing catalyst having a tendency for coke formation in the presence of such molecules. The term "substantially free" in this context means that the utility fluid comprises ≤10.0 wt. % (e.g., ≤5.0 wt. % or ≤1.0 wt. %) vinyl aromatics, based on the weight of the utility fluid.

Where hydroprocessing is envisioned, the utility fluid typically contains sufficient amount of molecules having one or more aromatic cores to effectively increase run length of the tar hydroprocessing process. For example, the utility fluid can comprise ≥50.0 wt. % of molecules having at least one aromatic core (e.g., ≥60.0 wt. %, such as ≥70 wt. %) based on the total weight of the utility fluid. In an aspect, the utility fluid comprises (i) ≥60.0 wt. % of molecule having at least one aromatic core and (ii) ≤1.0 wt. % of vinyl aromatics, the weight percents being based on the weight of the utility fluid.

The utility fluid can be one having a high solvency, as measured by solubility blending number ("$S_{Fluid}$"). For example, the utility fluid can have a $S_{Fluid}$≥90.0, e.g., ≥about 100.0, ≥about 110.0, ≥about 120.0, ≥about 150.0, ≥about 175.0, or ≥about 200.0. Additionally or alternatively, $S_{Fluid}$ can be ≤about 200.0, e.g., ≤about 175.0, ≤about 150.0, ≤about 125.0, ≤about 110.0, or ≤about 100.0. Ranges expressly disclosed include combinations of any of the above-enumerated values; e.g., 90.0 to about 200.0, about 100.0 to about 200.0, about 110.0 to about 200.0, about 120.0 to about 200.0, about 150.0 to about 200.0, about 175.0 to about 200.0, etc. Exemplary fluids include A200, A150, and A-100, available from ExxonMobil Chemical Company. Other exemplary fluid include methyl naphthalene, trimethyl benzene. Particular Exemplary fluids are described in U.S. Patent Application No. 61/986,316, filed on Apr. 30, 2014, incorporated by reference herein in its entirety. Steam cracker gas oil, which typically has a solubility blend number of about 100, and LCCO, typically having a solubility blending number of about 120, may also be used.

Additionally or alternatively, the utility fluid may be characterized by a kinetic viscosity of that is typically less than that of the fluid-feed mixture. In particular aspects, the kinetic viscosity of the fluid-feed mixture may be ≥about 0.1 cPoise, e.g., ≥about 0.5 cPoise, ≥about 1.0 cPoise, ≥about 2.5 cPoise or, ≥about 4.0 cPoise. Additionally or alternatively, the kinetic viscosity of the fluid-feed mixture may be ≤about 5.0 cPoise, e.g., ≤about 4.0 cPoise, ≤about 2.5 cPoise, ≤about 1.0 cPoise, ≤about 0.5 cPoise, or ≤about 0.25 cPoise. Ranges expressly disclosed include combinations of any of the above-enumerated values, e.g., about 0.1 to about 5.0 cPoise, about 0.5 to about 5.0 cPoise, about 1.0 to about 5.0 cPoise, about 2.5 to about 5.0 cPoise, about 4.0 to about 5.0 cPoise, etc. In some aspects, the kinematic viscosity is adjusted so that particles having a size larger than 25 μm settle out of the fluid-feed mixture to provide the solids-enriched portion (the extract) and particulate-depleted portions (the raffinate) described herein, more particularly to adjust the viscosity to also enable the amount of solids removal and throughput of the particle-depleted portion from the process.

The Separation Fluid

The separation fluid can be any hydrocarbon liquid, typically a non-polar hydrocarbon, or mixture thereof. In particular aspects, the separation fluid may be a paraffinic hydrocarbon or a mixture or paraffinic hydrocarbons. Particular paraffinic fluids include $C_5$ to $C_{20}$ hydrocarbons and mixtures thereof, particularly $C_5$ to $C_{10}$ hydrocarbons, e.g., hexane, heptane, and octane. Such fluids may be particularly useful when subsequent hydroprocessing is not desired. In certain aspects, the separation fluid has a mass density ≤0.91 g/ml, e.g., ≤0.90 g/ml, such as ≤0.89 g/ml, or ≤0.88 g/ml, e.g., in the range of 0.87 to 0.90 g/ml.

Separating the Higher Density and Lower Density Portions

The fluid-feed mixture may be separated by any means suitable for forming the higher density and lower density portions. In particular aspects, the fluid-feed mixture may be separated by sedimentation, filtration, extraction, etc. Conventional separations technology can be utilized, but the invention is not limited thereto. For example, the lower density portion may be separated by decantation, filtration and/or boiling point separation (e.g., one or more distillation towers, splitters, flash drums, etc.). The higher density portion may be separated in a similar manner, e.g., by removing the higher density portion from the separations stage as a bottoms portion. In particular aspects, the fluid-feed mixture is separated by exposing the fluid-feed mixture to a centrifugal force, e.g., by employing one or more centrifuges in the separations stage. Aspects of the invention employing centrifuge separations in the separations stage will now be described in more detail. The invention is not limited to these aspects, nor is this description to be interpreted as foreclosing the use of additional and/or alternative separations technologies, such as those that do not involve exposing the fluid-feed mixture to a centrifugal force.

Inducing the Centrifugal Force

In particular aspects, the fluid-feed mixture is provided to a centrifuge for exposing the fluid-feed mixture to a centrifugal force sufficient to form at least a higher density portion and a lower density portion. Typically, the fluid-feed mixture in the centrifuge exhibits a substantially uniform circular motion as a result of an applied central force. Depending on reference-frame choice, the central force can be referred to as a centrifugal force (in the reference-frame of the fluid-feed mixture) or a centripetal force (in the reference frame of the centrifuge). The particulars of the centrifuge design and operation are not critical. The process may be performed in a batch, semi-batch or continuous manner.

Determining a force sufficient to separate the higher density and lower density portions is within the skill in the art and will depend on a number of factors, particularly the physical and chemical characteristics of the feed. In some aspects a sufficient force will be provided by a centrifuge operating at about 1000 to about 10000 rpm, about 2000 to about 7500 rpm, or about 3000 to about 5000 rpm. The centrifuge may be configured to apply heat to the fluid-feed mixture, e.g., by exposing the fluid-feed mixture to an elevated temperature. Any convenient temperature may be used. In some aspects, inducing the centrifugal force includes exposing the fluid-feed mixture to a temperature in the range of about 20 to about 100° C., particularly about 25 to 75° C., or 30 to 60° C. The centrifugal force may be applied for any amount of time. Typically the force is applied for ≥about 1 minute, e.g., ≥about 5 minutes, ≥about 10 minutes, ≥about 30 minutes, ≥about 60 minutes or, ≥about 120 minutes. Additionally or alternatively, the centrifugal force may be applied for ≤about 120 minutes, ≤about 60 minutes, ≤about 30 minutes, ≤about 10 minutes, or ≤about 5 minutes. Ranges expressly disclosed include combinations of any of the above-enumerated values; e.g., about 1 to about 120 minutes, about 5 to about 120 minutes, about 10 to about 120 minutes, about 30 to about 120 minutes, about 60 to about 120 minutes, etc.

Centrifuging the fluid-feed mixture typically results in separating from the fluid-feed mixture at least (i) an extract comprising a higher density portion of the fluid-feed mixture and (ii) a raffinate comprising a lower density portion. In other words, exposing the fluid-feed mixture to the centrifugal force results in the removal of at least the higher density portion (the extract) from the fluid-feed mixture. When the process is operated continuously or semi-continuously, at least two streams can be conducted away from the centrifuging: a first stream comprising the extract and a second stream comprising the raffinate. Centrifuges with such capabilities are commercially available.

Typically centrifuging is sufficient to segregate ≥about 80.0 wt. %, ≥about 90.0 wt. %, ≥about 95.0 wt. %, ≥about 99.0 wt. % of solids having size ≥2.0 μm, e.g., ≥10.0 μm, ≥20.0 μm, or ≥25.0 μm, into the higher density portion (e.g., the extract), the wt. % being based on the total weight of solids in the higher density and lower density portions. Where subsequent hydroprocessing of the raffinate is envisioned, the higher density portion should comprise ≥about 95.0 wt. %, particularly ≥about 99.0 wt. %, of solids having a size of ≥25.0 μm, particularly, ≥20.0 μm, ≥10.0 μm, or ≥2.0 μm. In other aspects, e.g., where the lower density portion (e.g., the raffinate) is not subjected to hydroprocessing, filtration should be sufficient to segregate at least 80 wt. % of the solids into the higher density portion.

While the description focuses on a higher density portion and a lower density portion, aspects of the invention envision, that the components of the fluid-feed mixture may be more discretely segregated and extracted, e.g., very light components segregating to the top of the mixture, a portion that comprises primarily the fluid therebelow, an upgraded tar portion, tar heavies, solids at the bottom of the centrifuge chamber, etc. Each of these portions, or combinations thereof may be selectively removed from the mixture as one or more raffinates. Typically, the higher density portion discussed below is selected to extract undesired tar heavies and solid components, while the lower density portion includes the remainder.

The Higher Density Portion

However the higher density portion and lower density portion are separated, the higher density portion, particularly the liquid-phase part thereof, may have an insolubility number, $I_{HD}$, ≥about 20.0, ≥about 40.0, ≥about 70.0, ≥about 90.0, ≥about 100.0, ≥about 110.0, ≥about 120.0, ≥about 130.0, ≥about 140.0, or ≥about 150.0. Additionally or alternatively, $I_{HD}$, may be ≤about 40.0, ≤about 70.0, ≤about 90.0, ≤about 100.0, ≤about 110.0, ≤about 120.0, ≤about 130.0, ≤about 140.0, or ≤about 150.0. Ranges expressly disclosed include combinations of any of the above-enumerated values; e.g., about 20.0 to about 150.0, about 40.0 to about 150.0, about 70.0 to about 150.0, about 90.0 to about 150.0, about 100.0 to about 150.0, about 110.0 to about 150.0, about 120.0 to about 150.0, about 130.0 to about 150.0, about 140.0 to about 150.0, etc.

Additionally or alternatively, the higher density portion may, but need not, comprise asphaltenes and/or tar heavies. In particular aspects, the higher density portion, particularly the liquid portion thereof, comprises ≥50.0 wt. % asphaltenes, e.g., ≥60.0 wt. %, ≥75.0 wt. %, based on the total weight of the higher density portion. The higher density portion may include ≤10.0 wt. %, e.g., ≤7.5 wt. %, ≤5.0 wt. %, ≤2.5 wt. %, ≤2.0 wt. %, ≤1.5 wt. %, or ≤1.0 wt. %, of the total asphaltene content of the hydrocarbon feed. The higher density portion may include ≥1.0 wt. %, e.g., ≥1.5 wt. %, ≥2.0 wt. %, ≥2.5 wt. %, ≥5.0 wt. %, or ≥7.5 wt. %, of the total asphaltene content of the hydrocarbon feed. Ranges expressly disclosed include combinations of any of the above-enumerated values; e.g., 1.0 to 10.0 wt. %, 1.0 to 7.5 wt. %, 1.0 to 5.0 wt. %, 1.0 to 2.5 wt. %, 1.0 to 2.0 wt. %, 1.0 to 1.5 wt. %, etc., of the total asphaltene content of the hydrocarbon feed. Removal of lower amounts of the asphaltene content may be preferred. For example, it has been surprisingly found that the segregation of even small amounts of asphaltenes into the higher density portion has a surprising impact on the insolubility number of the lower density portion. While not wishing to be bound by any theory or model, it is believed that the presence of relatively high-density asphaltenes in the hydrocarbon feed have a much greater impact on insolubility number than do lower-density asphaltenes. Thus, a relatively large amount of problematic molecules can be separated, leaving in the lower density portion molecules that will contribute to the over-all yield of the process.

The benefits of the invention may be obtained even when the higher density portion comprises a relatively small fraction of the hydrocarbon feed. The higher density portion may comprise ≤10.0 wt. %, e.g., ≤7.5 wt. %, ≤5.0 wt. %, ≤2.5 wt. %, ≤2.0 wt. %, ≤1.5 wt. %, or ≤1.0 wt. % of the total weight of the hydrocarbon feed. Ranges expressly disclosed include combinations of any of the above-enumerated values; e.g., 1.0 to 10.0 wt. %, 1.0 to 7.5 wt. %, 1.0 to 5.0 wt. %, 1.0 to 2.5 wt. %, 1.0 to 2.0 wt. %, 1.0 to 1.5 wt. %, etc. of the total weight of the hydrocarbon feed. The removal of a relatively small weight fraction may surprisingly be accompanied by a relatively large improvement in the insolubility number of the lower density portion. The particulates present in the extract optionally have a mass density ≥1.05 g/ml, e.g., ≥1.10 g/ml, such as ≥1.2 g/ml, or ≥1.3 g/ml.

The Lower Density Portion

The lower density portion is generally removed from the separation stage as raffinate, which can be conducted away for one or more of storage, blending with other hydrocarbons, further processing, etc. The lower density portion generally has a desirable insolubility number, e.g., an insolubility number that is less than that of the hydrocarbon feed and/or less than that of the higher density portion. Typically, the insolubility number of the lower density portion ($I_{LD}$) is ≥about 20.0, e.g., ≥about 30, ≥about 40, ≥about 50.0, ≥about 60.0, ≥about 70.0, ≥about 80.0, ≥about 90.0, ≥about 100.0, ≥about 110.0, ≥about 120.0, ≥about 130.0, ≥about 140.0, or ≥about 150.0. Additionally or alternatively, the $I_{LD}$ may be ≤about 150.0, e.g., ≤about 140.0, ≤about 130.0, ≤about 120.0≤about 110.0, ≤about 100.0, ≤about 90.0, ≤about 80.0, ≤about 70.0, ≤about 60.0, ≤about 50.0, ≤about 40.0, or ≤about 30.0. Ranges expressly disclosed include combinations of any of the above-enumerated values; e.g., about 20.0 to about 150.0, about 20.0 to about 140.0, about 20.0 to about 130.0, about 20.0 to about 120.0, about 20.0 to about 110.0, about 20.0 to about 100.0, about 20.0 to about 90.0, about 20.0 to about 80.0, about 20.0 to about 70.0, about 20.0 to about 60.0, about 20.0 to about 50.0, about 20.0 to about 40.0, about 20.0 to about 30.0, etc. Those skilled in the art will appreciate that hydrocarbon separations technology is imperfect, and, consequently, a small amount of solids may be present in the lower density portion, e.g., an amount of solids that is ≤0.1 times the amount of solids in the fluid-feed mixture, such as ≤0.01 times. In aspects where at least part of the lower density portion is hydroprocessed, solids-removal means (e.g., one or more filters) are typically employed between the separation stage and the hydroprocessing stage.

The ratio of the insolubility number of the lower density portion, $I_{LD}$, to the insolubility number of the hydrocarbon feed, $I_{feed}$, is ≤0.95, e.g., ≤about 0.90, ≤about 0.85, ≤about 0.80, ≤about 0.75, ≤about 0.70, ≤about 0.65, ≤about 0.60, ≤about 0.55, ≤about 0.50, ≤about 0.40, ≤about 0.30, ≤about 0.20, or ≤about 0.10. Additionally or alternatively, the ratio of $I_{LD}$ to $I_{feed}$ may be ≥about 0.10, e.g., ≥about 0.20, ≥about 0.30, ≥about 0.40, ≥about 0.50, ≥about 0.55, ≥about 0.60, ≥about 0.65, ≥about 0.70, ≥about 0.75, ≥about 0.80, ≥about 0.85, or ≥about 0.90. Ranges expressly disclosed include combinations of any of the above-enumerated values, e.g., about 0.10 to 0.95, about 0.20 to 0.95, about 0.30 to 0.95, about 0.40 to 0.95, about 0.50 to 0.95, about 0.55 to 0.95, about 0.60 to 0.95, about 0.65 to 0.95, about 0.70 to 0.95, about 0.75 to 0.95, about 0.80 to 0.95, about 0.85 to 0.95, about 0.90 to 0.95, etc.

The Treated Portion

Typically it is desired to recover the fluid, e.g., for recycle and re-use in the process. Fluid can be recovered as a second raffinate from the separation stage, or alternatively/additionally can be separated from the first raffinate (e.g., the lower density portion) in a second separation stage located downstream of the first separation stage. For example, the fluid may optionally be separated from the lower density portion to form a treated portion of the hydrocarbon. Any suitable separation means may be used. For example, the fluid may be separated by fractionation, such as in one or more distillation towers, or by vapor-liquid separation, such as by one or more vapor-liquid separators. Alternatively, the fluid may be separated via one or more flash drums, splitters, fractionation towers, membranes, absorbents, etc., though the invention is not limited thereto. The recovered fluid recovered for further use, e.g., for recycle to the process.

The treated portion may have an insolubility number, $I_{treated}$, ≥about 20.0, e.g., ≥about 30 ≥about 40, ≥about 50.0, ≥about 60.0, ≥about 70.0, ≥about 80.0, ≥about 90.0, ≥about 100.0, ≥about 110.0, ≥about 120.0, ≥about 130.0, ≥about 140.0, ≥about 150.0. Additionally or alternatively, the insolubility number of the treated portion may be ≤about 150.0, e.g., ≤about 140.0, ≤about 130.0, ≤about 120.0, ≤about 110.0, ≤about 100.0, ≤about 90.0, ≤about 80.0, ≤about 70.0, ≤about 60.0, ≤about 50.0, ≤about 40.0, or ≤about 30.0. Ranges expressly disclosed include combinations of any of the above-enumerated values; e.g., about 20.0 to about 150.0, about 20.0 to about 140.0, about 20.0 to about 130.0, about 20.0 to about 120.0, about 20.0 to about 110.0, about 20.0 to about 100.0, about 20.0 to about 90.0, about 20.0 to about 80.0, about 20.0 to about 70.0, about 20.0 to about 60.0, about 20.0 to about 50.0, about 20.0 to about 40.0, or about 20.0 to about 30.0, etc.

The ratio of the insolubility number of the treated portion, $I_{treated}$, to the insolubility number of the hydrocarbon feed, $I_{feed}$, is i≤0.95, e.g., ≤about 0.90, ≤about 0.85, ≤about 0.80, ≤about 0.75, ≤about 0.70, ≤about 0.65, ≤about 0.60, ≤about 0.55, ≤about 0.50, ≤about 0.40, ≤about 0.30, ≤about 0.20, or ≤about 0.10. Additionally or alternatively, the $I_{treated}$:$I_{feed}$ ratio may be ≥about 0.10, e.g., ≥about 0.20, ≥about 0.30, ≥about 0.40, ≥about 0.50, ≥about 0.55, ≥about 0.60, ≥about 0.65, ≥about 0.70, ≥about 0.75, ≥about 0.80, ≥about 0.85, or ≥about 0.90. Ranges expressly disclosed include combinations of any of the above-enumerated value, e.g., about 0.10 to 0.95, about 0.20 to 0.95, about 0.30 to 0.95, about 0.40 to 0.95, about 0.50 to 0.95, about 0.55 to 0.95, about 0.60 to 0.95, about 0.65 to 0.95, about 0.70 to 0.95, about 0.75 to 0.95, about 0.80 to 0.95, about 0.85 to 0.95, about 0.90 to 0.95, etc.

Hydroprocessing

Additionally or alternatively, at least part of (i) the lower density portion and/or (ii) the treated portion may be provided to a hydroprocessing unit, effectively increasing run-length of the hydroprocessing unit. Typically, the fluid is not separated from the raffinate prior to hydroprocessing. In other words, except for solids-removal, at least part of the raffinate can be conducted from a first separation stage to the hydroprocessor without any intervening processing or separating. The amount of fluid in the raffinate during hydroprocessing may be in the range of from about 5.0 wt. % to about 80.0 wt. % fluid, based on the weight of the raffinate, e.g., about 10.0 wt. % to about 80.0 wt. %, such as about 10.0 wt. % to about 60.0 wt. %.

Hydroprocessing of the lower density portion can occur in one or more hydroprocessing stages, the stages comprising one or more hydroprocessing vessels or zones. Vessels and/or zones within the hydroprocessing stage in which catalytic hydroprocessing activity occurs generally include at least one hydroprocessing catalyst. The catalysts can be mixed or stacked, such as when the catalyst is in the form of one or more fixed beds in a vessel or hydroprocessing zone.

Conventional hydroprocessing catalyst can be utilized for hydroprocessing the lower density portion, such as those specified for use in resid and/or heavy oil hydroprocessing, but the invention is not limited thereto. Suitable hydroprocessing catalysts include those comprising (i) one or more bulk metals and/or (ii) one or more metals on a support. The metals can be in elemental form or in the form of a compound. In one or more aspects, the hydroprocessing catalyst includes at least one metal from any of Groups 5 to 10 of the Periodic Table of the Elements (tabulated as the Periodic Chart of the Elements, The Merck Index, Merck & Co., Inc., 1996). Examples of such catalytic metals include, but are not limited to, vanadium, chromium, molybdenum, tungsten, manganese, technetium, rhenium, iron, cobalt, nickel, ruthenium, palladium, rhodium, osmium, iridium, platinum, or mixtures thereof. In one or more aspects, the catalyst is a bulk multimetallic hydroprocessing catalyst with or without binder. In an aspect the catalyst is a bulk trimetallic catalyst comprised of two Group 8 metals, preferably Ni and Co and the one Group 6 metals, preferably Mo. Conventional hydrotreating catalysts can be used, but the invention is not limited thereto. In certain aspects, the catalysts include one or more of KF860 available from Albemarle Catalysts Company LP, Houston Tex.; Nebula® Catalyst, such as Nebula® 20, available from the same source; Centera® catalyst, available from Criterion Catalysts and Technologies, Houston Tex., such as one or more of DC-2618, DN-2630, DC-2635, and DN-3636; Ascent® Catalyst, available from the same source, such as one or more of DC-2532, DC-2534, and DN-3531; and FCC pre-treat catalyst, such as DN3651 and/or DN3551, available from the same source. However, the invention is not limited to only these catalysts.

Hydroprocessing the lower density portion (e.g., the raffinate) leads to improved catalyst life, e.g., allowing the hydroprocessing stage to operate for at least 3 months, or at least 6 months, or at least 1 year without replacement of the catalyst in the hydroprocessing or contacting zone. Since catalyst life is generally lengthened when heavy hydrocarbon is hydroprocessed in the presence of utility fluid, e.g., >10 times longer than would be the case if no utility fluid were utilized, it is generally desirable to recover utility fluid (e.g., for recycle and reuse) from the hydroprocessor effluent instead of from the hydroprocessor feed.

The amount of coking in the hydroprocessing or contacting zone is relatively small and run lengths are relatively long as indicated by relatively a small increase in reactor pressure drop over its start-of-run ("SOR") value, as calculated by ([Observed pressure drop−Pressure drop$_{SOR}$]/Pressure drop$_{SOR}$)*100%. The increase in pressure drop may be ≤10.0%, ≤5.0%, ≤2.5%, or ≤1.0%. Additionally or alternatively, the hydroprocessing reactor's increase in pressure drop compared to its SOR value may be ≤30 psi (2 bar), e.g., ≤25 psi (1.7 bar), ≤20 psi (1.3 bar), ≤15 psi (1.0 bar), ≤10 psi (0.7 bar), or ≤5 psi (0.3 bar), ≥1.0 psi (0.07 bar), ≥5.0 psi (0.3 bar), ≥10.0 psi (0.7 bar), ≥15.0 psi (1.0 bar), ≥20.0 psi (1.3 bar), or ≥25.0 psi (1.7 bar). Ranges of the pressure drop expressly disclosed include all combinations of these values, e.g., 1.0 to 30 psi (0.07 bar to 2 bar), 1.0 to 25.0 psi (0.07 bar to 1.7 bar), 1.0 to 20.0 psi (0.07 bar to 1.3 bar), 1.0 to 15.0 psi (0.07 bar to 1.0 bar), 1.0 to 10.0 psi (0.07 bar to 0.7 bar), 1.0 to 5.0 psi (0.07 bar to 0.3 bar), etc. The pressure drop may be determined between any two convenient times, $T_1$ and $T_2$. $T_1$ is typically the time associated with the SOR value. $T_2$ may be any arbitrary time thereafter. Thus, the observed pressure drop may be determined over a period, $T_2$-$T_1$, ≥about 30 days ≥about 50 days, ≥about 75 days, ≥about 100 days, ≥about 125 days, ≥about 150 days, ≥about 175 days, ≥about 200 days, ≥about 250 days, ≥about 300 days, ≥about 350 days, ≥about 400 days, ≥about 450 days, ≥about 500 days, ≥about 550 days, ≥about 600 days, ≥about 650 days, or ≥about 700 days or more.

The hydroprocessing is carried out in the presence of hydrogen, e.g., by (i) combining molecular hydrogen with the tar stream and/or fluid upstream of the hydroprocessing and/or (ii) conducting molecular hydrogen to the hydroprocessing stage in one or more conduits or lines. Although relatively pure molecular hydrogen can be utilized for the hydroprocessing, it is generally desirable to utilize a "treat gas" which contains sufficient molecular hydrogen for the hydroprocessing and optionally other species (e.g., nitrogen and light hydrocarbons such as methane) which generally do not adversely interfere with or affect either the reactions or the products. Unused treat gas can be separated from the hydroprocessed product for re-use, generally after removing undesirable impurities, such as $H_2S$ and $NH_3$. The treat gas optionally contains ≥about 50 vol. % of molecular hydrogen, e.g., ≥about 75 vol. %, based on the total volume of treat gas conducted to the hydroprocessing stage.

Optionally, the amount of molecular hydrogen supplied to the hydroprocessing stage is in the range of from about 300 SCF/B (standard cubic feet per barrel) (53 standard cubic meter of treat gas per cubic meter of feed, "S m$^3$/m$^3$") to 5000 SCF/B (890 S m$^3$/m$^3$), in which B refers to barrel of feed to the hydroprocessing stage. For example, the molecular hydrogen can be provided in a range of from 1000 SCF/B (178 S m$^3$/m$^3$) to 3000 SCF/B (534 S m$^3$/m$^3$). Hydroprocessing the lower density portion, molecular hydrogen, and a catalytically effective amount of the specified hydroprocessing catalyst under catalytic hydroprocessing conditions produces a hydroprocessed effluent. An example of suitable catalytic hydroprocessing conditions will now be described in more detail. The invention is not limited to these conditions, and this description is not meant to foreclose other hydroprocessing conditions within the broader scope of the invention.

The hydroprocessing is generally carried out under hydroconversion conditions, e.g., under conditions for carrying out one or more of hydrocracking (including selective hydrocracking), hydrogenation, hydrotreating, hydrodesulfurization, hydrodenitrogenation, hydrodemetallation, hydrodearomatization, hydroisomerization, or hydrodewaxing of the specified tar stream. The hydroprocessing reaction can be carried out in at least one vessel or zone that is located, e.g., within a hydroprocessing stage downstream of the pyrolysis stage and separation stage. The lower density portion including the fluid generally contacts the hydroprocessing catalyst in the vessel or zone, in the presence of molecular hydrogen. Catalytic hydroprocessing conditions can include, e.g., exposing the feed to the hydroprocessing reactor to temperature in the range from 50° C. to 500° C. or from 200° C. to 450° C. or from 220° C. to 430° C. or from 350° C. to 420° C. proximate to the molecular hydrogen and hydroprocessing catalyst. For example, a temperature in the range of from 300° C. to 500° C., or 350° C. to 430° C., or 360° C. to 420° C. can be utilized. Liquid hourly space velocity (LHSV) of the lower density portion will generally range from 0.1 to 30 h$^{-1}$, or 0.4 to 25 h$^{-1}$, or 0.5 h$^{-1}$ to 20 h$^{-1}$. In some aspects, LHSV is at least 5 h$^{-1}$, or at least 10 h$^{-1}$, or at least 15 h$^{-1}$. Molecular hydrogen partial pressure during the hydroprocessing is generally in the range of from 0.1 MPa to 8 MPa, or 1 MPa to 7 MPa, or 2 MPa to 6 MPa, or 3 MPa to 5 MPa. In some aspects, the partial pressure of molecular hydrogen is ≤7 MPa, or ≤6 MPa, or ≤5 MPa, or ≤4 MPa, or ≤3 MPa, or ≤2.5 MPa, or ≤2 MPa. The hydroprocessing conditions can include, e.g., one or more of a temperature in the range of 300° C. to 500° C., a pressure in the range of 15 bar (absolute) to 135 bar, or 20 bar to 120 bar, or 20 bar to 100 bar, a space velocity (LHSV) in the range of 0.1 to 5.0, and a molecular hydrogen consumption rate of about 53 S m$^3$/m$^3$ to about 445 S m$^3$/m$^3$ (300 SCF/B to 2500 SCF/B, where the denominator represents barrels of the tar stream, e.g., barrels of SCT). In one or more aspects, the hydroprocessing conditions include one or more of a temperature in the range of 380° C. to 430° C., a pressure in the range of 21 bar (absolute) to 81 bar (absolute), a space velocity in the range of 0.2 to 1.0, and a hydrogen consumption rate of about 70 S m$^3$/m$^3$ to about 267 S m$^3$/m$^3$ (400 SCF/B to 1500 SCF/B). When operated under these conditions using the specified catalyst, hydroconversion conversion is generally ≥25.0% on a weight basis, e.g., ≥50.0%.

In certain aspects, the hydroprocessed effluent comprises (i) a liquid phase comprising recoverable fluid and hydroprocessed product, and (ii) a vapor phase comprising light hydrocarbon gases such as methane, unconverted molecular hydrogen, heteroatom gases such as hydrogen sulfide. The vapor phase is typically separated and conducted away from the hydroprocessed product as an overhead stream. Typically, the vapor phase comprises about 5.0 wt. % of the total liquid feed to the reactor. Recoverable fluid can be separated from the hydroprocessed effluent, e.g., for reuse in the process. The recoverable fluid can have, e.g., substantially the same composition and true boiling point distribution as the utility fluid. In certain aspects, the recoverable fluid comprises ≥70.0 wt. % of aromatics, ≤10.0 wt. % of paraffins, and having a final boiling point ≤750° C., e.g., ≤510° C., such as ≤430° C. After separation of the recoverable fluid, the remainder of the liquid phase comprises a hydroprocessed product having generally desirable blending characteristics compared to those of the hydrocarbon feed.

Initiation of hydroprocessing may also include the use of a primer fluid as described in U.S. Patent Application No. 61/986,316, e.g., until sufficient recoverable fluid is available for recycle and reuse. It has been surprisingly discovered that, after a startup transition period, the hydroprocessing process equilibrates so that sufficient fluid to sustain the process (i.e., without any make-up or supplemental fluid from a source external to the process) may be obtained as recoverable fluid from the hydroprocessed effluent.

The Hydroprocessed Effluent

In certain aspects, at least the following components are separated from the hydroprocessed effluent: (i) an overhead stream and (ii) a fluid-enriched stream comprising recoverable fluid, and a hydroprocessed product. The hydroprocessed product is typically, but not necessarily, removed from the liquid-phase portion of the hydroprocessed effluent as a bottoms fraction. The overhead comprises from 0 wt. % to 20 wt. % of the hydroprocessed effluent. The fluid-enriched stream comprises from 20 to 70 wt. % of the hydroprocessed effluent. The hydroprocessed product comprises from 20 to 70 wt. % of the hydroprocessed effluent.

In other aspects, the overhead stream comprises from 5 wt. % to 10 wt. % of the hydroprocessed effluent. The fluid-enriched stream comprises from 30 to 60 wt. % of the hydroprocessed effluent. The hydroprocessed product comprises from 30 to 70 wt. % of the hydroprocessed effluent.

The overhead stream, the fluid-enriched stream, and hydroprocessed product can be separated by any separation means, including conventional separations means, e.g., one or more flash drums, splitters, fractionation towers, membranes, absorbents, etc., though the invention is not limited thereto. Fractionation, for example, may be accomplished in one or more distillation towers, or by vapor-liquid separation, for example, by one or more vapor-liquid separators. Describing the separated portions of the hydroprocessed effluent as the overhead stream, the fluid-enriched stream, and hydroprocessed product is not intended to preclude separation in any order or by any particular method of separation. For example, components of the overhead stream and the fluid-enriched stream may be initially separated from the hydroprocessed product as a single stream via a flash drum overhead leaving the desired hydroprocessed product as a flash drum bottoms phase. The overhead and the fluid-enriched stream may later be separated from each other according to any convenient method and the overhead may optionally be carried away for further processing.

The Hydroprocessed Product Portion of the Hydroprocessed Effluent

The hydroprocessed product has an insolubility number, $I_{product}$, less than that of (i) the hydrocarbon feed and typically (ii) less than that of the lower density portion. In particular aspects, the insolubility number, $I_{product}$, of the hydroprocessed product may be ≥about 20.0, e.g., ≥about 30, ≥about 40, ≥about 50.0, ≥about 60.0, ≥about 70.0, ≥about 80.0, ≥about 90.0, ≥about 100.0, ≥about 110.0, ≥about 120.0, ≥about 130.0, ≥about 140.0, or ≥about 150.0. Additionally or alternatively, $I_{product}$ may be ≤about 150.0, e.g., ≤about 140.0, ≤about 130.0, ≤about 120.0, ≤about 110.0, ≤about 100.0, ≤about 90.0, ≤about 80.0, ≤about 70.0, ≤about 60.0, ≤about 50.0, ≤about 40.0, or ≤about 30.0. Ranges expressly disclosed include combinations of any of the above-enumerated values; e.g., about 20.0 to about 150.0, about 20.0 to about 140.0, about 20.0 to about 130.0, about 20.0 to about 120.0, about 20.0 to about 110.0, about 20.0 to about 100.0, about 20.0 to about 90.0, about 20.0 to about 80.0, about 20.0 to about 70.0, about 20.0 to about 60.0, about 20.0 to about 50.0, about 20.0 to about 40.0, about 20.0 to about 30.0, etc.

The ratio of the insolubility number of the hydroprocessed product, $I_{product}$, to the insolubility number of the hydrocarbon feed, $I_{feed}$, may be ≤0.90, e.g., ≤about 0.85, ≤about 0.80, ≤about 0.75, ≤about 0.70, ≤about 0.65, ≤about 0.60, ≤about 0.55, ≤about 0.50, ≤about 0.40, ≤about 0.30, ≤about 0.20, or ≤about 0.10. Additionally or alternatively, the ratio may be ≥about 0.10, e.g., ≥about 0.20, ≥about 0.30, ≥about 0.40, ≥about 0.50, ≥about 0.55, ≥about 0.60, ≥about 0.65, ≥about 0.70, ≥about 0.75, ≥about 0.80, or ≥about 0.85. Ranges expressly disclosed include combinations of any of the above-enumerated values; e.g., about 0.10 to 0.90, about 0.20 to 0.90, about 0.30 to 0.90, about 0.40 to 0.90, about 0.50 to 0.90, about 0.55 to 0.90, about 0.60 to 0.90, about 0.65 to 0.90, about 0.70 to 0.90, about 0.75 to 0.90, about 0.80 to 0.90, about 0.85 to 0.90, etc.

The ratio of the insolubility number of the hydroprocessed product, $I_{product}$, to the insolubility number of the lower density portion, $I_{LD}$, may be ≤0.95, e.g., ≤about 0.90, ≤about 0.85, ≤about 0.80, ≤about 0.75, ≤about 0.70, ≤about 0.65, ≤about 0.60, ≤about 0.55, ≤about 0.50, ≤about 0.40, ≤about 0.30, ≤about 0.20, or ≤about 0.10. Additionally or alternatively, ratio may be ≥about 0.10, e.g., ≥about 0.20, ≥about 0.30, ≥about 0.40, ≥about 0.50, ≥about 0.55, ≥about 0.60, ≥about 0.65, ≥about 0.70, ≥about 0.75, ≥about 0.80, or ≥about 0.85. Ranges expressly disclosed include combinations of any of the above-enumerated values; e.g., about 0.10 to 0.95, about 0.20 to 0.95, about 0.30 to 0.95, about 0.40 to 0.95, about 0.50 to 0.95, about 0.55 to 0.95, about 0.60 to 0.95, about 0.65 to 0.95, about 0.70 to 0.95, about 0.75 to 0.95, about 0.80 to 0.95, about 0.85 to 0.95, about 0.90 to 0.95, etc.

Blending

One or more of the portions described herein (i.e., lower density portion, treated portion, or hydroprocessed product) or one or more parts thereof, may be designated for blending with a second hydrocarbon, e.g., a heavy hydrocarbon such as one or more fuel oil blend-stocks. When a part of a portion is designated for blending, the part is typically obtained by dividing a stream of the portion, and designating one of the divided streams for blending. Typically all of the "parts" of a stream have substantially the same composition. In particular aspects, the fuel oil blend-stock and designated stream are selected such that the difference between the solubility blending number of the fuel oil-blend-stock, $S_{FO}$, and the insolubility number of the designated stream (i.e., $I_{LD}$, $I_{treated}$, or $I_{product}$ as the case may be) is ≥about 5.0 e.g., ≥about 10.0, about ≥20.0, or ≥about 30.0 or more. Additionally or alternatively, the difference may be ≤about 30.0, e.g., ≤about 20.0, ≤about 10.0. Ranges expressly disclosed include combinations of any of the above-enumerated values; e.g., about 5.0 to about 30.0, about 10.0 to about 30.0, about 20.0 to about 30.0, etc. In particular aspects, the fuel oil blend stock has a solubility blend number, $S_{FO}$, of ≥about 50.0, e.g., ≥about 60.0, ≥about 75.0, ≥about 85.0, ≥about 90.0, ≥about 95.0, or ≥about 100.0. Additionally or alternatively, $S_{FO}$ may be ≤about 100.0, e.g., ≤about 95.0, ≤about 90.0, ≤about 85.0, ≤about 75.0, or ≤about 60.0. Expressly disclosed ranges of $S_{FO}$ include combinations of any of the above-enumerated values, e.g., about 50.0 to about 100.0, about 60.0 to about 100.0, about 75.0 to about 100.0, about 85.0 to about 100.0, about 90.0 to about 100.0, about 95.0 to 100.0, etc. Non-limiting examples of fuel oil blend stocks suitable for blending with the lower density portion (with or without the fluid) include one or more of bunker fuel, burner oil, heavy fuel oil (e.g., No. 5 or No. 6 fuel oil), high-sulfur fuel oil, low-sulfur fuel oil, regular-sulfur fuel oil (RSFO), and the like. Optionally, trim molecules may be separated, for example, in a fractionator, from bottoms or overhead or both and added to the fluid as desired. The mixture of the fuel oil blend-stock and the desired portion further processed in any manner.

The amount of designated stream that may be included in the blend is not particular. In some aspects, e.g., where the designated stream includes lower density portion, treated portion, and/or hydroprocessed product, the amount of the lower density portion, treated portion, and/or hydroprocessed product may be ≥about 5.0 wt. %, e.g., ≥about 10.0 wt. %, ≥about 20.0 wt. %, ≥about 30.0 wt. %, ≥about 40.0 wt. %, ≥about 50.0 wt. %, ≥about 60.0 wt. %, ≥about 70.0 wt. %, ≥about 80.0 wt. %, or ≥about 90.0 wt. % or more. Additionally, or alternatively, the amount of the lower density portion, treated portion, and/or hydroprocessed product that may be included in the blend may be ≤about 80.0 wt. %, ≤about 70.0 wt. %, ≤about 60.0 wt. %, ≤about 50.0 wt. %, ≤about 40.0 wt. %, ≤about 30.0 wt. %, ≤about 20.0 wt. %, or ≤about 10.0 wt. %. Expressly disclosed ranges of the amount include combinations of any of the above-enumerated values, e.g., about 5.0 to about 90 wt. %, about 10.0 to about 90 wt. %, about 20.0 to about 90 wt. %, about 30.0 to about 90 wt. %, about 40.0 to about 90 wt. %, about 50.0 to about 90 wt. %, about 60.0 to about 90.0 wt. %, about 70.0 to about 90.0 wt. %, about 80.0 to about 90.0 wt. %, etc. All amounts are based on the total weight the lower density portion, treated portion, and/or hydroprocessed product, as the case may be, that does not form solids in the blend comprising the lower density portion, treated portion, and/or hydroprocessed product and the fuel oil blend-stock. In other words, blending the designated stream with the second hydrocarbon does not typically result in asphaltene precipitation, and the blends are generally substantially free of precipitated asphaltenes. Since the higher-density asphaltenes, the ones believed to have a particularly adverse effect on feed hydrocarbon blending, are typically less numerous than the more innocuous lower density asphaltenes, the relative amount of the lower density portion, treated portion, and/or hydroprocessed product may be surprisingly high in some cases, compared to the amount of higher density portion.

Aspects of the invention also include improving the compatibility of SCTs produced under different conditions (i.e., having different compositions). In such aspects, one or more SCTs may be treated by the methods described herein.

Certain aspects will now be described with reference to one or more of the Figures. Thus, FIG. 1 schematically illustrates features of a process 100 according to an aspect of the invention. In process 100, a hydrocarbon feed is provided via feed line 102. The hydrocarbon feed is combined with a fluid, typically provided via line 104, to form a fluid-feed mixture. Solids in the fluid feed mixture may optionally be separated in filtration unit 106 before entering a first separations stage 108 (stage 108 comprising at least one centrifuge) via inlet 110. The centrifuge of stage 108 applies a centrifugal force to the fluid-feed mixture sufficient to form a higher density portion and a lower density portion. An extract comprising the higher density portion may exit stage 108 via line 112, e.g., for storage, disposal, or further processing. A raffinate comprising the lower density portion exits stage 108 via line 114. Optionally, the raffinate is filtered in a second filtration unit 116 before entering optional second separation stage 118. Optional second separation unit 118 preferably separates from the raffinate a fluid-enriched stream 120 that may be recycled to the process, e.g., to fluid line 104. A second raffinate, which typically, but not necessarily (particularly where solvent assisted hydroprocessing is desired), comprises the remainder of the first raffinate after separation of the fluid-enriched stream can exit the optional second separation unit via line 122. The second raffinate can be removed from the process, e.g., for storage and/or further processing, such as blending with other hydrocarbon feed or fuel oil.

Figure 2:
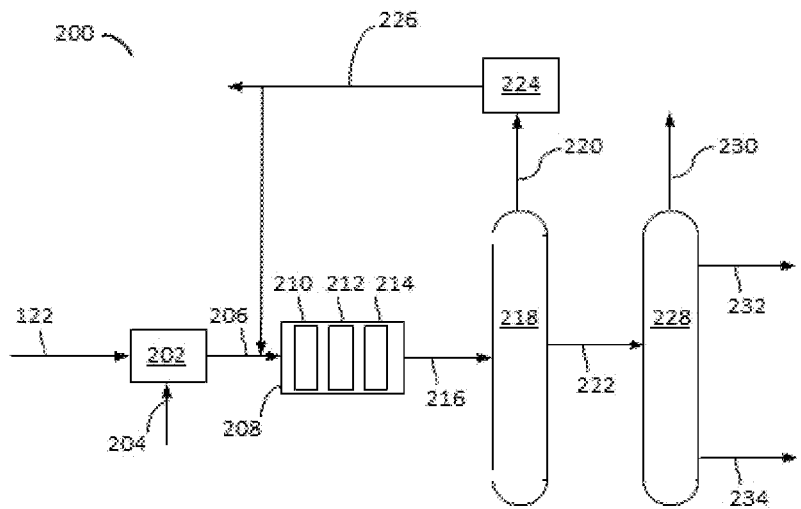
FIG. 2 illustrates a process 200 according to an aspect of the invention.

With continuing reference to FIG. 1, FIG. 2 schematically illustrates a process 200 according to aspects of the invention. In FIG. 2, the contents in line 122 (e.g., the second raffinate) may be conducted to preheat stage 202. A treat gas comprising molecular hydrogen is obtained from one or more conduits 204. Optionally, the treat gas is heated before it is combined with the second raffinate. The treat gas can be combined with the second raffinate in stage 202, as shown in the figure, but this is not required. In other aspects, at least a portion of the treat gas is combined with the second raffinate upstream and/or downstream of stage 202. The mixture of second raffinate+treat gas is then conducted via conduit 206 to hydroprocessing stage 208. Mixing means can be utilized for combining the pre-heated second raffinate mixture with the pre-heated treat gas in hydroprocessing stage 208, e.g., mixing means may be one or more gas-liquid distributors of the type conventionally utilized in fixed bed reactors. The mixture is hydroprocessed in the presence of optional primer fluid, and one or more of the specified hydroprocessing catalysts, the hydroprocessing catalyst being deployed within hydroprocessing stage 208 in at least one catalyst bed 210. Additional catalyst beds, e.g., 212, 214, etc., with intercooling quench using treat gas, from conduit 202, can be provided between beds, if desired. The hydroprocessing conditions and choice of primer fluid, and when one is utilized, can be the same as those specified in U.S. Patent Application No. 62/005,679.

Hydroprocessed effluent is conducted away from stage 208 via conduit 216 to a third separation stage 218 for separating from the hydroprocessor effluent (i) a vapor-phase product 220 (the total vapor product, which comprises, e.g., heteroatom vapor, vapor-phase cracked products, unused treat gas, etc.) and (ii) a liquid-phase product 222 which comprises, e.g., recoverable fluid and hydroprocessed product, such as hydroprocessed tar. Third separation stage 218 can include one or more conventional separators, e.g., one or more flash drums, but the invention is not limited thereto. In a particular aspect, the amount (determined at room temperature) of liquid-phase product is about 95.0 wt. % of the total liquid feed (combined fluid and hydrocarbon feed from conduit 110) to hydroprocessing stage 208.

The vapor-phase product may be conducted away from stage 218 via conduit 220 for further processing, e.g., to upgrading stage 224, e.g., for $H_2S$ removal. Molecular hydrogen obtained from stage 224, optionally in the presence of light hydrocarbon vapor and other vapor diluent, can be re-cycled for re-use as a treat gas component via conduit 226 to the hydroprocessing stage 208.

The liquid-phase product, which typically constitutes the remainder of the hydroprocessed effluent, is conducted away from stage 218 via conduit 222 to fourth separation stage 228. A bottoms stream comprising from 20 to 70 wt. % of the liquid phase conducted to stage 228 can be separated and carried away via conduit 234, e.g., for storage and/or further processing, such as blending with a second hydrocarbon. A second vapor phase, which includes, e.g., an overhead stream comprising from 0 wt. % to 20 wt. % of the liquid phase, can be separated and carried away via conduit 230. The second vapor phase, which is primarily vapor dissolved or entrained in the liquid phase 222, typically comprises $C_{4-}$ fuel gas, which may optionally be combined with vapor phase product in conduit 220, if desired. A fluid-enriched stream comprising recoverable fluid is separated and conducted via conduit 232 for re-cycle and re-use to mix with the hydrocarbon feed, e.g., in line 102.

Additional Aspects

Aspect 1: A process for upgrading a hydrocarbon feed, comprising: (a) combining a hydrocarbon feed having an insolubility number, $I_{feed}$, with at least a first fluid to form a fluid-feed mixture; and (b) inducing a centrifugal force to the fluid-feed mixture sufficient to form at least a higher density portion and a lower density portion, the lower density portion having an insolubility number, $I_{LD}$, wherein the ratio $I_{LD}:I_{feed}$ is ≤0.95.

Aspect 2: Aspect 1, wherein the higher density portion has a higher asphaltene concentration than the hydrocarbon feed and/or the lower density portion has a lower asphaltene concentration than the hydrocarbon feed.

Aspect 3: The method of Aspect 1 or 2, further comprising removing at least a part of the fluid from the lower density portion to form a treated portion, the treated portion having an insolubility number, $I_{treated}$, wherein the ratio $I_{treated}:I_{feed}$≤0.95, e.g., about 0.10 to 0.95, about 0.20 to 0.95, about 0.30 to 0.95, about 0.40 to 0.95, about 0.50 to 0.95, about 0.55 to 0.95, about 0.60 to 0.95, about 0.65 to 0.95, about 0.70 to 0.95, about 0.75 to 0.95, about 0.80 to 0.95, about 0.85 to 0.95, or about 0.90 to 0.95.

Aspect 4: Aspect 3, further comprising combining at least a portion of the treated portion with a fuel oil blend-stock having a solubility number, $S_{FO}$, ≥about 50.0, ≥about 60.0, ≥about 70.0, ≥about 80.0, ≥about 90.0, about 50.0 to about 90.0, or about 70 to about 90.0.

Aspect 5: Any of aspects 1 to 4, further comprising feeding the lower density portion to a hydroprocessing reactor to produce a hydroprocessed effluent.

Aspect 6: Aspect 5, further comprising separating from the hydroprocessed effluent at least a hydroprocessed product having an insolubility number, $I_{product}$, and a fluid-enriched stream.

Aspect 7: Aspect 6, further comprising combining at least a portion of the hydroprocessed product with a fuel oil blend-stock having a solubility number, $S_{FO}$, ≥about 50.0, ≥about 60.0, ≥about 70.0, ≥about 80.0, ≥about 90.0, about 50.0 to about 90.0, or about 70 to about 90.0.

Aspect 8: Any of Aspects 1 to 7, wherein the higher density portion has an insolubility number, $I_{HD}$, ≥about 20.0, ≥about 40.0, ≥about 70.0, ≥about 90.0, ≥about 100.0, ≥about 110.0, ≥about 120.0, ≥about 130.0, ≥about 140.0, ≥about 150.0, about 20.0 to 150.0, about 40.0 to about 150, about 70.0 to about 150.0, about 90.0 to about 150.0, about 100.0 to 150.0, about 110.0 to 150.0, about 120.0 to 150.0, about 130.0 to 150.0, about 140.0 to 150.0, etc.

Aspect 9: Any of Aspects 1 to 7, wherein the difference between the solubility blending number of the fuel oil-blend-stock, $S_{FO}$, and the insolubility number one or more of $I_{LD}$, $I_{treated}$, or $I_{product}$ is ≥about 5.0 e.g., about 5.0 to about 30.0, about 10.0 to about 30.0, about 20.0 to about 30.0, etc.

Aspect 10: Any of Aspects 1 to 9, wherein the higher density portion, particularly a liquid portion thereof, comprises ≥50.0 wt. % asphaltenes, based on the total weight of the higher density portion.

Aspect 11: Any of Aspects 1 to 10, wherein the higher density portion comprises ≤10.0 wt. % of the total asphaltene content of the hydrocarbon feed.

Aspect 12: Any of Aspects 1 to 11, wherein the higher density portion comprises ≥about 80.0 wt. %, ≥about 90.0 wt. %, ≥about 95.0 wt. %, ≥about 99.0 wt. % of solids having size ≥2.0 μm, ≥20.0 μm, or ≥25.0 μm, the wt. % being based on the total weight of solids in the higher density and lower density fractions.

Aspect 13: Any of Aspects 1 to 12, wherein the fluid has a solubility blending number, $S_{Fluid}$, ≥90.0, e.g., ≥about 100.0; e.g., about 90.0 to 200.0, about 100.0 to about 200.0, about 110.0 to about 200.0, about 120.0 to about 200.0, about 150.0 to about 200.0, or about 175.0 to about 200.0.

Aspect 14: Any of Aspects 1 to 13, wherein the hydrocarbon feed has an insolubility number, $I_{feed}$, of ≥about 20; e.g., about 20.0 to about 150, about 30.0 to about 150.0, about 40 to about 150.0, about 50.0 to about 150.0, about 60.0 to about 150.0, about 70.0 to about 150.0, about 80.0 to about 150.0 about 90.0 to about 150.0, about 100.0 to about 150.0, about 110.0 to about 150.0, about 120 to about 150.0, about 120.0 to about 150.0, about 130.0 to about 150.0, or about 140.0 to about 150.0.

Aspect 15: Any of Aspects 1 to 14, wherein the hydrocarbon feed comprises a steam cracker tar, a resid, or a combination thereof.

Aspect 16: A method of hydroprocessing a hydrocarbon feed comprising: (a) combining a hydrocarbon feed having an insolubility number, $I_{feed}$, with at least a first fluid to form a fluid-feed mixture; (b) inducing a centrifugal force to the fluid-feed mixture sufficient to form at least a higher density portion and a lower density portion, and (c) feeding said lower density portion to a hydroprocessing reactor operating at hydroprocessing conditions to produce a hydroprocessed effluent.

Aspect 17: Aspect 16, wherein the hydroprocessing conditions include a temperature of about 50° C. to 500° C., a pressure of 15 bar (absolute) to 135 bar, and a space velocity (LHSV) in the range of 0.1 to 5.0.

Aspect 18: Aspect 16 or 17, wherein the higher density portion comprises ≥about 95.0 wt. %, ≥about 99.0 wt. % of solids having size ≥2.0 μm, ≥20.0 μm, or ≥25.0 μm, the wt. % being based on the total weight of solids in the higher density and lower density fractions.

Aspect 19: Any of Aspects 16 to 18, further comprising separating from the hydroprocessed effluent at least a hydroprocessed product having an insolubility number, $I_{product}$, and a fluid-enriched stream.

Aspect 20: Aspect 19, wherein the ratio $I_{product}:I_{feed}$≤0.90, e.g., about 0.10 to 0.90, about 0.20 to 0.90, about 0.30 to 0.90, about 0.40 to 0.90, about 0.50 to 0.90, about 0.55 to 0.90, about 0.60 to 0.90, about 0.65 to 0.90, about 0.70 to 0.90, about 0.75 to 0.90, about 0.80 to 0.90, or about 0.85 to 0.90, etc.

Aspect 21: Any of Aspects 16 to 20, further comprising combining at least a portion of the hydroprocessed product with a fuel oil blend-stock having a solubility blending number, $S_{FO}$, ≥about 50.0, ≥about 60.0, ≥about 70.0, ≥about 80.0, ≥about 90.0, about 50.0 to about 90.0, or about 70.0 to about 90.0.

Aspect 20: Aspect 19, wherein the difference between the solubility blending number of the fuel oil-blend-stock, $S_{FO}$, and the insolubility number one or more of $I_{treated}$, or $I_{product}$ is ≥about 5.0, e.g., about 5.0 to about 30.0, about 10.0 to about 30.0, or about 20.0 to about 30.0, etc.

Aspect 21: Any of Aspects 16 to 20, wherein the higher density portion has an insolubility number, $I_{HD}$, ≥about 20.0, e.g., about 20.0 to 150.0, about 40.0 to about 150, about 70.0 to about 150.0, about 90.0 to about 150.0, about 100.0 to 150.0, about 110.0 to 150.0, about 120.0 to 150.0, about 130.0 to 150.0, or about 140.0 to 150.0.

Aspect 22: Any of Aspects 16 to 21, wherein the lower density portion has an insolubility number, $I_{LD}$, wherein the ratio $I_{LD}$:$I_{feed}$ is ≤0.95, ≤0.90, ≤0.85, ≤0.80, ≤0.75, ≤0.70, ≤0.65, ≤0.60, ≤0.55, or ≤0.50.

Aspect 23: Any of Aspects 16 to 22, wherein the hydrocarbon feed has an insolubility number, $I_{feed}$, of ≥about 20; e.g., about 20.0 to about 150, about 30.0 to about 150.0, about 40 to about 150.0, about 50.0 to about 150.0, about 60.0 to about 150.0, about 70.0 to about 150.0, about 80.0 to about 150.0 about 90.0 to about 150.0, about 100.0 to about 150.0, about 110.0 to about 150.0, about 120 to about 150.0, about 120.0 to about 150.0, about 130.0 to about 150.0, or about 140.0 to about 150.0.

Aspect 24: Any of Aspects 15 to 23 wherein the hydrocarbon feed comprises a steam cracker tar, a resid, or a combination thereof.

Aspect 25: An apparatus for upgrading a hydrocarbon feed, comprising: a) hydrocarbon feed source in fluid communication with a fluid source to provide a fluid-feed mixture, and b) a first separation unit configured to receive the fluid-feed mixture, said separation unit comprising a centrifuge capable of separating from the hydrocarbon feed a higher density portion and a lower density portion and for removing at least the lower density portion.

Aspect 26: Aspect 25, further comprising a hydroprocessing reactor in fluid communication with the first separation unit, said hydroprocessing reactor capable of providing a hydroprocessed effluent from the lower density portion.

Aspect 27: Aspect 26, further comprising a second separation unit for separating from the hydroprocessed effluent a fluid-enriched stream and a hydroprocessed product.

Aspect 28: Aspect 27, further comprising a recycle conduit for transporting the fluid-enriched stream to the fluid source.

Aspect 29: Any of Aspects 25 to 28, further comprising means for blending at least a portion of the lower density portion, the hydroprocessed effluent, or the hydroprocessed product with a fuel oil blend-stock.

Aspect 30: A method of upgrading a steam cracker tar, comprising: a) combining a hydrocarbon feed having an insolubility number, $I_{feed}$, with at least a first fluid to form a fluid-feed mixture; and b) separating from the fluid-feed mixture at least a higher density portion and a lower density portion, said lower density portion having an insolubility number, $I_{LD}$, wherein $I_{LD}/I_{feed}$≤0.95.

Aspect 31: Any of aspects, 1 to 30, wherein the fluid-feed mixture comprises, about 5.0 to about 95.0 wt. %, about 5.0 to about 90.0 wt. %, about 5.0 to about 80 wt. %, about 5.0 to about 70.0 wt. %, about 5.0 to about 60.0 wt. %, about 5.0 to about 50.0 wt. %, about 5.0 to about 40.0 wt. %, about 5.0 to about 30.0, about 5.0 to about 20.0, or about 5.0 to about 10.0 wt. % fluid, based on the total weight of the fluid-feed mixture, particularly where the fluid comprises about 65.0 to about 100.0 wt. %, about 75.0 to about 100.0 wt. %, about 80.0 to about 100.0 wt. %, about 85.0 to about 100.0 wt. %, about 90.0 to about 100.0 wt. %, or about 95.0 to about 100.0 wt. % utility fluid.

Aspect 32: Any of Aspects 1 to 30, wherein the wherein the fluid-feed mixture comprises, about 5.0 to about 95.0 wt. %, about 5.0 to about 90.0 wt. %, about 5.0 to about 80 wt. %, about 5.0 to about 70.0 wt. %, about 5.0 to about 60.0 wt. %, about 5.0 to about 50.0 wt. %, about 5.0 to about 40.0 wt. %, about 5.0 to about 30.0, about 5.0 to about 20.0, or about 5.0 to about 10.0 wt. % fluid, based on the total weight of the fluid-feed mixture, particularly where the fluid comprises about 50.0 to about 100.0 wt. %, about 60.0 to about 100.0 wt. %, about 70.0 to about 100.0 wt. %, about 80.0 to about 100.0 wt. %, about 90.0 to about 100.0 wt. %, about 95.0 to about 100.0 wt. %, about 97.5 to about 100.0 wt. %, or about 99.0 to about 100.0 wt. % fluid.

EXPERIMENTAL $C_7$ Insolubles Test: 10-30 grams of sample weighed to the nearest 0.01 gm is placed into a 500 cc pre-dried and weighed round bottom flask (a 1 L flask is used for more than 25 grams of material.) Add n-heptane in the ratio of 10 mL of solvent to 1 gram of sample. The combination of n-heptane and sample is mixed with a roto-evaporator (no vacuum) while heating at a temperature of 65-70° C. for about 1 hour. The combination is then mixed overnight at about 25° C. under a nitrogen atmosphere with a magnetic stir bar. If insolubles are present they will be visible on the sides of the flask.

Insolubles are filtered by passing the entire solution through a pre-dried and weighed medium porosity Buchner funnel (150-350 mL) attached to a vacuum flask. The flask is washed with three 25 cc portions of heptane preheated to 65-70° C. to remove all residual oil from the flask and added to the filter to help remove oil from the insoluble portion of the sample. Insoluble material should be removed from the walls of the flask. Where insolubles remain the flask is dried and weighed to accurately determine the total amount of insolubles. If the sample has a high wax content, then the extra solvent washings should be done with 65-70° C. heptane to insure wax is removed from the asphaltenic insolubles.

The insoluble portion contained in the Buchner funnel is transferred to a vacuum oven attached to a mechanical pump. The soluble portion is transferred to a pre-weighed round bottom flask which is then placed on a roto-evaporator at 50-55° C. to remove the bulk heptane. Some heptane will remain in the sample even if no more is being seen in the condenser. Removal of the remaining heptane is accomplished by transferring the flask to a vacuum oven along with the insolubles and heated to 90° C. for at least 12 hours.

Example 1

In Example 1, a STC having a solubility blending number of about 216 is combined in a 60:40 ratio (wt:wt) with a first mid-cut fluid having a solubility blending number of about 123. The mixture is allowed to equilibrate at about 25° C. for approximately 24 hours. The fluid-SCT mixture is then heated at 95° C. for 30 minutes. After heating, the fluid-SCT mixture is transferred to a series of centrifuge tubes. A second fluid, heptane, is added to each centrifuge tube in order to change the solubility blending number as shown in Table 1. The combination of the fluid-feed mixtures and heptane are thoroughly mixed and stored at about 25° C. for approximately 24 hours. The resulting mixtures are then centrifuged for 1 hour at 4000 rpm and 40° C. The supernatant (i.e., the lower density portion) is decanted to a second centrifuge tube and used to measure the compatibility parameters. Total $C_7$ Insolubles in the remaining higher density portion are determined in accordance with the Insolubles Test.

TABLE 1

| Sample | Feed (wt. %) | 1st Sep. fluid (wt. %) | 2nd Sep. fluid (wt. %) | Sol. Blend. No., S (wt. %) | Sol. Blend. No., S (vol %) | HD Portion (wt. %) | C7 Insol. (wt. %) |
|---|---|---|---|---|---|---|---|
| 1a | 60 | 40 | 0 | 179 | 175 | 1.9 | — |
| 1b | 60 | 38 | 2 | 175 | 171 | 1.1 | 0.12 |
| 1c | 60 | 36 | 4 | 172 | 168 | 1.2 | — |
| 1d | 60 | 34 | 6 | 169 | 165 | 1.3 | — |
| 1e | 60 | 31 | 9 | 163 | 159 | 1.7 | — |
| 1f | 60 | 26 | 14 | 154 | 151 | 2.1 | 0.12 |
| 1g | 60 | 18 | 22 | 139 | 136 | 6.4 | — |
| 1h | 60 | 12 | 28 | 128 | 125 | 11.4 | 4.69 |

Figure 3:
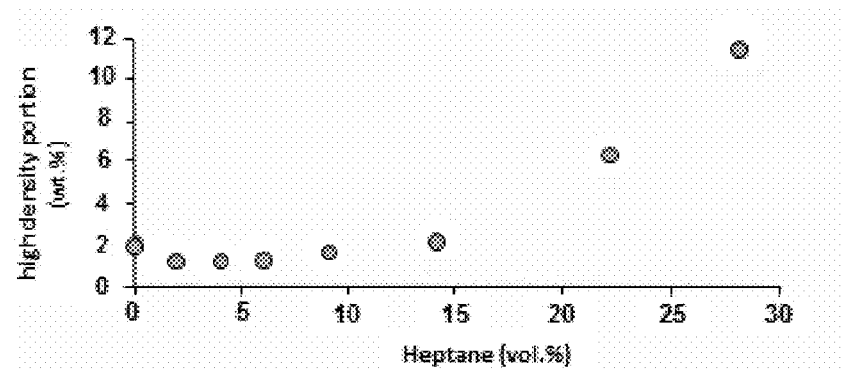
FIG. 3 illustrates the amount of the higher density portion formed in the presence of varying amounts of heptane combined with a fluid having a high solubility blending number.
Figure 4:
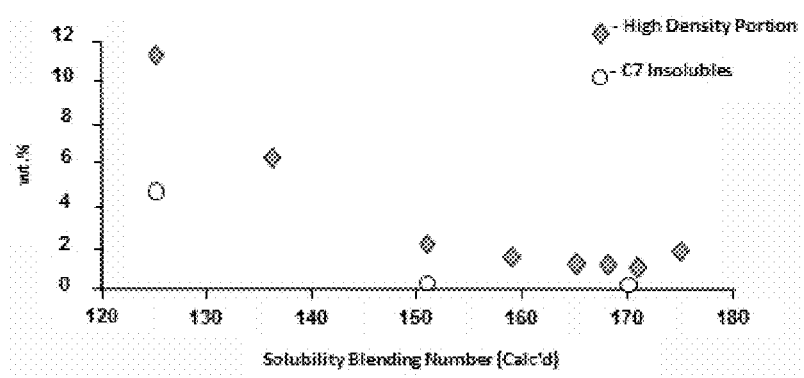
FIG. 4 compares the amount of the higher density portion and $C_7$ insolubles separated with the solubility blending number of the fluid.

As shown in FIG. 3, the weight percent of the higher density portion increases with increasing heptane content. Without wishing to be held to any particular theory, it is believed that higher heptane content causes the separation of the heavy sludge which includes coke fines, asphaltenes and a heavy liquid portion. The dramatic increase in the weight percent of the higher density portion from 2.1 to 6.4 wt. % is believed to be due to a relatively large amount of components of the feed becoming incompatible when the mixture comprises about 78 wt. % feed and about 22 wt. % hexane and a resulting solubility blending number of about 130-140. FIG. 4 shows that as the solubility blending number increases the amount of higher density portion that separates decreases. FIG. 4 also shows that while $C_7$ insolubles are present in the higher density portion at a solubility blending number of 125, the higher density portion contains essentially no $C_7$ insolubles at a solubility blending number of about 150 and higher.

Example 2

In Example 2, a tar sample having an insolubility number of about 130 is centrifuged at about 4000 rpm for about for 55 minutes at about 40° C. The lower density portion that separates is isolated and the insolubility number of the lower density portion is determined. The insolubility number of the lower density portion is about 105. The higher density portion separated by the centrifuge process represents about 1.5 wt. % of the tar sample.

Example 3

In Example 3, Example 2 is substantially reproduced except that the tar has an insolubility number of about 118 before being subjected to the centrifuge treatment. After centrifuging, the lower density portion separated thereby has an insolubility number of about 108. The higher density portion separated by the centrifuge process represents about 1.5 wt. % of the tar sample.

Example 4

In Example 4, Example 2 is substantially reproduced except that a different tar having an insolubility number of about 130 before being subjected to the centrifuge treatment is used. After being centrifuged, the lower density portion separated thereby has an insolubility number of about 115. The higher density portion separated by the centrifuge process represents about 1.5 wt. % of the tar sample.

Figure 5:
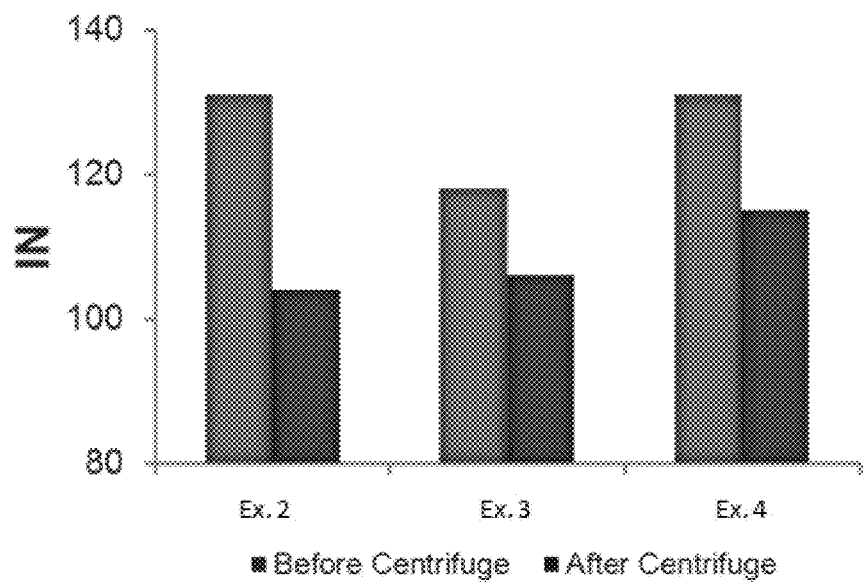
FIG. 5 compares the performance of a hydroprocessing a filtered feed with that of a feed prepared according to an aspect of the invention.

FIG. 5 compares the insolubility numbers of before and after centrifuge treatment for Examples 2-4.

Example 5

In Example 5, the tar of Example 2 is combined with fluid having a solubility blending number of about 179. The fluid is a mid-cut utility fluid described in U.S. Pat. Appl. No. 61/986,316. The feed to the reactor comprises about 50.0 wt. % of the tar and about 50.0 wt. % of the fluid. A 45.7 cm length of ⅜ inch (0.9525 cm) SS tubing is used as the reactor. The middle 34 cm is held at a near-isothermal temperature of 400° C. during the course of the experiment. The reactor is loaded with 18 $cm^3$ of a commercial NiMo oxide on alumina hydrotreating catalyst (RT-621).

The reactor is sulfided by flowing a 20 wt. % solution of dimethyldisulfide in Isopar™ M through the packed reactor at 0.042 mL/min for 1 hour at 100° C., then for 12 hours at 240° C., and finally for 60 hours at 340° C. The sulfiding procedure is performed while flowing 20 standard cubic centimeters per minute (sccm) $H_2$ at 1000 psig (67 bar gauge) of pressure.

100.0 wt. % of a feedstock is filtered prior to being provided to the reactor. The feedstock is fed to the reactor at a weight hourly space velocity (WHSV) of about 1.0 $hr^{-1}$. Additionally, molecular hydrogen is fed to reactor at a rate of 1500 standard cubic feet per barrel (scfb). Reactor pressure is held at 1000 psig (67 bar gauge) and a temperature of 380 to 415° C.

The reactor is operated semi-continuously in the following sequence:
  (a) A batch of tar and first/utility fluid feedstock is hydroprocessed as specified in the reactor.
  (b) A total vapor product "offgas" is separated from the reactor effluent and discarded.
  (c) The hydroprocessed product (liquid) is collected from each batch. The amount of hydroprocessed product is approximately 95.0 wt. % of the total liquid feed to the reactor.
  (d) The hydroprocessed product from each batch is separated using a rotary evaporator into overhead (5 to 10 wt. %), mid-cut (40 to 50 wt. %), and bottoms (40 to 50 wt. %).
  (e) The mid-cut from the previous batch is used as fluid for the subsequent batch (simulating recycle). Excess mid-cut from each batch is discarded. Trimethylbenzene is used as primer fluid to initiate hydroprocessing since no mid-cut is available at the start of hydroprocessing.

Each batch requires about 5 days to complete. The reactor is operated semi-continuously under substantially the specified conditions for approximately 30 days while monitoring the pressure drop. Results are shown in FIG. 6.

Example 6

Example 5 is substantially repeated, except that the hydrocarbon feed comprising about 50 wt. % of the tar and about 50 wt. % of the fluid is centrifuged at about 4000 rpm for about for 55 minutes at about 40° C. The lower density portion is subjected to hydrotreatment and the pressure drop in the reactor is monitored as in Example 5. Results are shown in FIG. 6.

Figure 6:
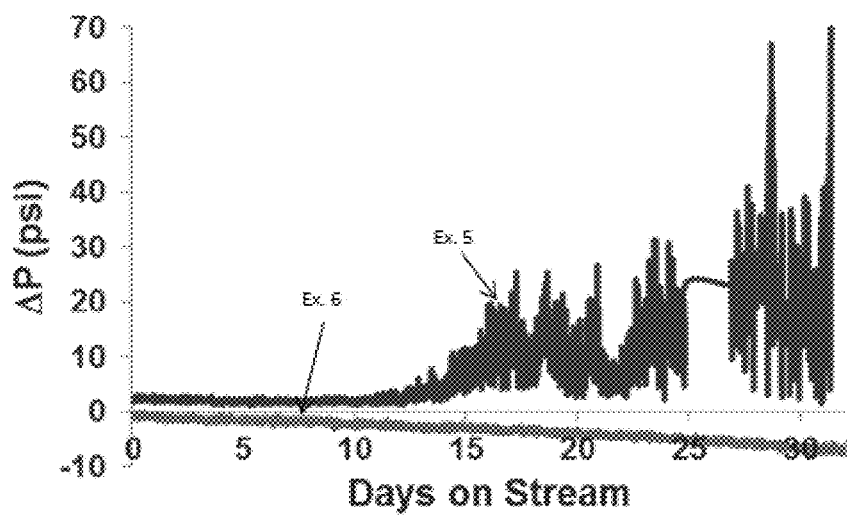
FIG. 6 is a plot of reactor pressure drop per days on stream.

As FIG. 6 shows, the filtered feed of Example 5 shows an increasingly large and unsteady pressure drop over the course the hydroprocessing procedure. Example 6, on the other hand, shows that the pressure drop remains steady and does not significantly increase, indicative a of a smoothly processing feed that does not significantly foul the reactor. The negative values of the pressure drop are believed to relate to the relatively small baseline drift in the data.

All documents described herein are incorporated by reference herein for purposes of all jurisdictions where such practice is allowed, including any priority documents and/or testing procedures to the extent they are not inconsistent with this text, provided however that any priority document not named in the initially filed application or filing documents is NOT incorporated by reference herein. As is apparent from the foregoing general description and the specific aspects, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A method for upgrading a hydrocarbon feed, comprising:
    (a) combining a hydrocarbon feed having an insolubility number, $I_{feed}$, with at least a first fluid to form a fluid-feed mixture;
    (b) inducing a centrifugal force to the fluid-feed mixture sufficient to form at least a higher density portion and a lower density portion, said lower density portion having an insolubility number, $I_{LD}$, wherein $I_{LD}/I_{feed} \leq 0.95$;
    (c) feeding said lower density portion to a hydroprocessing reactor to produce a hydroprocessed effluent;
    (d) separating from the hydroprocessed effluent at least a hydroprocessed product having an insolubility number, $I_{product}$, and a fluid-enriched stream;
    (e) combining at least a portion of the hydroprocessed product with a fuel oil having a solubility blending number, $S_{FO}$, $\geq 50.0$.

2. The method of claim 1, wherein (i) the higher density portion has a higher asphaltene concentration than the hydrocarbon feed and/or (ii) the lower density portion has a lower asphaltene concentration than the hydrocarbon feed.

3. The method of claim 1, further comprising removing at least a part of the fluid from the lower density portion to form a treated portion, the treated portion having an insolubility number, $I_{treated}$, wherein $I_{treated}/I_{feed}$ is $\leq 0.95$.

4. The method of claim 3, further comprising combining at least a portion of the treated portion with a fuel oil having a solubility blending number, $S_{FO}$, $\geq 50.0$.

5. The method of claim 1, wherein the higher density portion comprises $\geq 50.0$ wt. % asphaltenes, based on the total weight of the higher density portion.

6. The method of claim 1, wherein the higher density portion comprises $\leq 10.0$ wt. % of the total asphaltene content of the hydrocarbon feed.

7. The method of claim 1, wherein the higher density portion comprises 80.0 wt. % of solids having size $>2.0$ μm, the wt. % being based on the total weight of solids in the higher density and lower density fractions.

8. The method of claim 1, wherein the fluid has a solubility blending number, $S_{Fluid}$ $\geq 90.0$.

9. The method of claim 1, wherein the hydrocarbon feed comprises a SCT, a resid or a combination thereof.

10. A method of hydroprocessing a hydrocarbon feed, comprising:
    a) combining a hydrocarbon feed having an insolubility number, $I_{feed}$, with at least a first fluid to form a fluid-feed mixture;
    b) inducing a centrifugal force to the fluid-feed mixture sufficient to form at least a higher density portion and a lower density portion;
    c) feeding said lower density portion to a hydroprocessing reactor operating at hydroprocessing conditions to produce a hydroprocessed effluent;
    d) separating from the hydroprocessed effluent at least a hydroprocessed product having an insolubility number, $I_{product}$, and a fluid-enriched stream; and
    e) combining at least a portion of the hydroprocessed product with a fuel oil having an solubility blending number, $S_{FO}$, $\geq 50.0$.

11. The method of claim 10, wherein the higher density portion comprises $\geq 95.0$ wt. % of solids having size $>2.0$ μm, the wt. % being based on the total weight of solids in the higher density and lower density fractions.

12. The method of claim 10, wherein $I_{product}/I_{feed} \leq 0.95$.

13. The method of claim 10, wherein the lower density portion has an insolubility number, $I_{LD}$, and wherein $I_{LD}/I_{feed}$ is $\leq 0.95$.

14. The method of claim 10 wherein the hydrocarbon feed comprises a SCT, a resid or a combination thereof.

* * * * *